(12) United States Patent
Chandrasekaran et al.

(10) Patent No.: US 10,045,203 B2
(45) Date of Patent: Aug. 7, 2018

(54) ENTERPRISE SOFTWARE/FIRMWARE MANAGEMENT AND DISTRIBUTION

(71) Applicant: Verizon Patent and Licensing Inc., Basking Ridge, NJ (US)

(72) Inventors: Gayathri Chandrasekaran, Somerset, NJ (US); Joe Varghese, Neshanic Station, NJ (US); Jangam Deenaraj Joshi, Basking Ridge, NJ (US); Brian Matthew White, Port Murray, NJ (US); Rachel YuYin Ward, Basking Ridge, NJ (US); Sivagnanalingam Sivaganesh, Belle Mead, NJ (US); Sankar Shanmugam, Dayton, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/249,394

(22) Filed: Aug. 27, 2016

(65) Prior Publication Data
US 2018/0063700 A1 Mar. 1, 2018

(51) Int. Cl.
| | |
|---|---|
| *H04M 3/00* | (2006.01) |
| *H04W 8/20* | (2009.01) |
| *H04L 29/08* | (2006.01) |
| *H04W 88/02* | (2009.01) |
| *H04W 88/08* | (2009.01) |

(52) U.S. Cl.
CPC ............ *H04W 8/205* (2013.01); *H04L 67/14* (2013.01); *H04L 67/306* (2013.01); *H04L 67/10* (2013.01); *H04W 88/02* (2013.01); *H04W 88/08* (2013.01)

(58) Field of Classification Search
CPC ...... H04M 1/67; H04M 1/72544; H04M 1/57; H04M 1/2745; H04M 1/27455; H04W 12/08; H04W 36/14; H04W 52/0277; H04W 76/02
USPC ....... 455/415, 411, 418, 564, 466, 574, 550, 455/552.1, 420, 414.1, 419, 422.1, 517, 455/412.1
See application file for complete search history.

(56) References Cited

U.S. PATENT DOCUMENTS

| | | | |
|---|---|---|---|
| 6,199,204 B1* | 3/2001 | Donohue | G06F 8/65 705/59 |
| 2011/0014899 A1* | 1/2011 | Cugnini | H04N 7/17318 455/414.1 |
| 2012/0157098 A1* | 6/2012 | Singh | H04L 65/105 455/435.1 |
| 2012/0190386 A1* | 7/2012 | Anderson | G01C 15/04 455/456.3 |
| 2014/0179289 A1* | 6/2014 | Moon | H04W 4/12 455/415 |
| 2015/0137972 A1* | 5/2015 | Nepo | G08B 25/016 340/539.13 |

(Continued)

*Primary Examiner* — Joseph Arevalo

(57) ABSTRACT

Systems and methods relating to obtaining group criteria for mobile devices to be associated with a user-specified group; determining that a first mobile device satisfies the group criteria; obtaining a release time for the group in connection with a first software update; determining that availability of the first software update should not be indicated prior to the release time to the first mobile device based on the determination that the first mobile device satisfies the group criteria; and indicating, at a first time, to the first mobile device that the first software update is available based on the first time occurring during or after the release time.

18 Claims, 14 Drawing Sheets

(56) References Cited

U.S. PATENT DOCUMENTS

2017/0104878 A1* 4/2017 Razzano ............... H04M 15/28

* cited by examiner

Group Name:
Modo_Phones

6,540 Devices

Overlapping / Sub Groups (21 groups):
Beta_Testers (122 devices)
IT_Staff (55 devices)
Test_Stage1 (4 devices)
Test_Stage2 (8 devices)
show full group list...

Filter: (Make equal Modonova)  ~540

☐ automatically postpone MNO-provided updates

---

Devices in this group ▼  /430
Filter: [                    ] [Apply]

| ☐ Make ◆ | Model ◆ | MDN ▲ | Firmware ◆ |
|---|---|---|---|
| ☐ Modonova | GX100 /505 | 4412345678 /510 | -180D2 /512 |
| ☐ Modonova | GX200 | 4412345772 | 4.07.0D.08RGS |
| ☐ Modonova | MB2 | | 220_0.12.712W |
| ☐ Modonova | TV6 | | 2_9.8.1KD8 |
| ☐ Modonova 520 | GX2 | | 7.1D.08RGS |
| ☐ Modonova 522 | AT5 | | 5.1.1_LP523 |
| ☐ Modonova 524 | GM1 | | 2-180D2 |
| 526 528 | | | |

Popup menu:
Model GX200 (160 devices)
add to filter
select
remove from this group
create new subgroup ...
add to existing group ...

420 brackets rows; 440 brackets right side with scrollbar

Group Name:

Modo_Phones_sub1

160 Devices

Overlapping / Sub Groups (3 groups):
 Modo_Phones (160 devices)
 Beta_Testers (3 devices)
 IT_Staff (5 devices)

Filter: (Make equal Modonova) and (Model equal MX200)

☑ 710 automatically postpone MNO-provided updates

---

Devices in this group ▶

---

OEM Updates ▶

---

Software Management ▶

ENTERPRISE SOFTWARE/FIRMWARE MANAGEMENT AND DISTRIBUTION

BACKGROUND

In the mobile device industry, it is common practice for OEMs (original equipment manufacturers) to release a new mobile device and provide subsequent updates, such as to fix bugs in an initial firmware or provide additional features or security fixes as part of a new firmware. A mobile network operator (MNO) that provides mobile device services (such as, but not limited to, providing mobile devices to customers and/or providing wireless communication services for mobile devices) may receive a software update, such as a firmware update, from an OEM and perform OTA (over-the-air) distribution to all mobile devices meeting criteria for its installation (for example, a firmware update may be specific to a particular make and model of mobile device).

However, in this process of delivering software updates, the MNO is not able to test inoperability of the software update with all existing software on the market. For an enterprise customer with large numbers of mobile devices, which may have specific software packages or used for specific purposes, conventional techniques for delivering OEM- or MNO-provided software updates can create and/or expose software incompatibilities or other problems that interfere the customer's use of affected devices. However, conventional techniques for OTA software delivery fail to provide useful controls for mitigating such issues.

Additionally, an customer associated with many mobile devices may have particular software and/or configurations that the customer may wish to install on and/or update on a number of mobile devices. Although larger customers may be able to establish their own infrastructure for distributing and managing such installations and updates, many customers lack the time, skills, or resources to do so.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 5 illustrates an example of using the device portion of the UI illustrated in FIG. 4 to perform actions relating to subgroups of mobile devices associated with a group.

FIG. 7 illustrates an example of a UI for performing group-related operations via an SU management server, in which the group displayed in FIG. 7 is a subgroup created from the group illustrated in FIG. 4.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Figure 1:
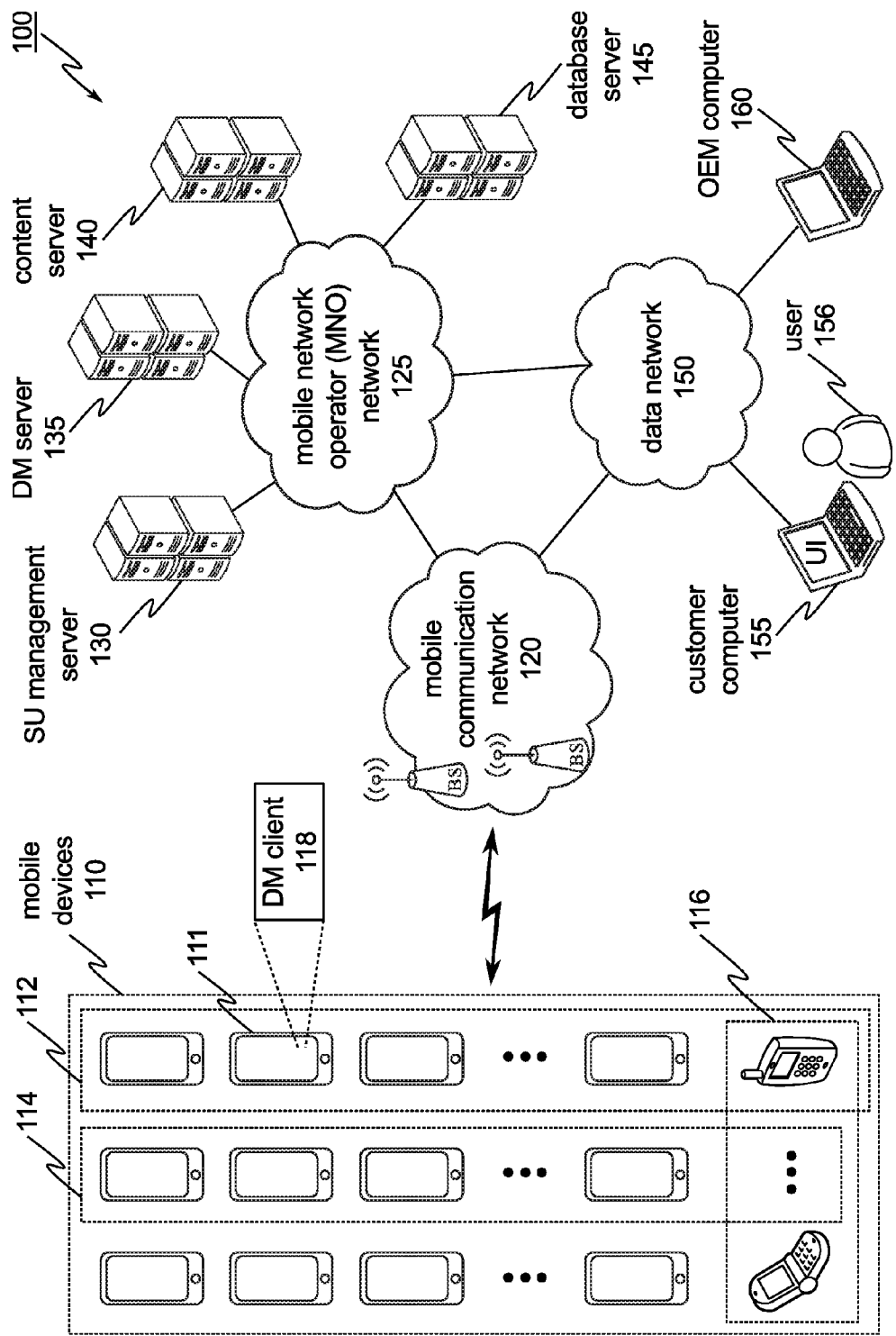
FIG. 1 illustrates a high-level functional block diagram of a software management and delivery system for implementing examples of the disclosed subject matter.

FIG. 1 illustrates a high-level functional block diagram of a software management and delivery system for implementing examples of the disclosed subject matter. Although a single SU (software update) management server 130, DM (device management) server 135, content server 140, database server 145, customer computer 155, and OEM (Original Equipment Manufacturer) computer 160 have been illustrated in FIG. 1 for simplicity, in practice there may be more SU management servers, DM servers, content servers, database servers, customer computers, and OEM computers. Also, in some implementations, one or more of SU management server 130, DM server 135, content server 140, and database server 145 may perform one or functions described as being performed by another one of SU management server 130, DM server 135, content server 140, and database server 145. Additionally, although some of the examples in this disclosure may be described in association with a single customer or a single OEM, software management and delivery system 100 may be configured, and in many implementations is configured, to provide the features described herein for multiple customers and multiple OEMs.

Software management and delivery system 100 includes mobile communications network 120, which may be a wireless voice and data communications network through which mobile devices, such as mobile devices 110, communicate with one another and with various computing systems, such as servers 130, 135, 140, and 145 on mobile network operator (MNO) network 125 and/or computing systems available via data network 150. Mobile communications network 120 may employ various technologies for enabling wireless communication such as, but not limited to, code division multiple access (CDMA), long term evolution (LTE), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (Wi-Fi), satellite, and the like.

A mobile device customer, such as a first customer to which mobile devices 112 are assigned, may be a subscriber to services provided by an MNO that may provide the mobile communications network 120. The MNO may also have a private network, such as MNO network 125, over which the MNO conducts operations of the MNO as well as provides support services for the mobile communications network 120. For example, servers 130, 135, 140, and 145 may be operated by the MNO and communicate via the MNO network 125.

FIG. 1 illustrates mobile devices 110, each of which is associated with a subscriber or customer of the MNO. In some cases, a single customer, such as "enterprise customer," may be associated with multiple mobile devices 110. For example, each of the mobile devices 112 is associated with a first customer, each of the mobile devices 114 is associated with a second customer, and the remaining mobile devices 110 are associated with various other customers. The number of mobile devices associated with a customer is essentially unlimited. Some or all of the mobile devices associated with a customer devices may be manufactured, sold, and/or managed by the customer. For example, a customer may manufacture and sell tens, hundreds, thousands, millions, or even more mobile devices, and be associated with those mobile devices for purposes of managing software installed on, or applied to, those mobile devices via MNO network 125.

As noted previously, mobile devices 110 may receive various services via mobile communications network 120. The services available for a particular mobile device 110 may depend on the capabilities of the mobile device (a mobile device may not include hardware or software features needed for a particular service) or may depend on which services a customer has subscribed to for the mobile device (which may vary across mobile devices for a single customer). Mobile devices 110 may take the form of, for example, portable handsets, smartphones, tablet computers, Internet nodes, laptops or other portable personal computers (PCs), or personal digital assistants (PDAs). Of course, mobile devices 110 may be implemented in other form factors, including various types of consumer and business electronic devices. Some of mobile devices 110 may include display and user input capabilities to support text and image communications, such as email, picture communication and web browsing applications. Still further, some of mobile devices 110 may be in the form of smartphones, such as the touch screen smartphone 111 shown in FIG. 1. Other examples of mobile devices 110 include "Internet of Things" (IoT) devices and wireless sensor networking devices. Mobile devices 110 each may include a wireless transceiver compatible with a type of packet data service offered via mobile communications network 120. In some examples and/or under certain circumstances, a first mobile device 110 may obtain services via a second mobile device 110; for example, a tablet computer may communicate via Wi-Fi with a smartphone configured to communicate via mobile communications network 120.

Some or all of mobile devices 110 may be configured to provide remote DM (device management) capabilities. Mobile device 111 illustrates an example that includes a DM client 118 implemented as instructions stored in a machine readable medium included in mobile device 111 (such as a portion of a flash memory storing firmware). DM client 118 is configured to interact with DM server 135, such as receiving, processing, and/or responding to commands issued by DM server 135 to DM client 118 to provide remote DM of mobile device 111. The Open Mobile Alliance (OMA) DM working group and the Data Synchronization (DS) working group have defined an OMA-DM protocol that provides a unified client/server interface to device management. For example, the OMA-DM protocol specifies exchange of packages during a session, each package consisting of several messages. Each message in turn comprises one or more commands. In some examples, DM client 118 and DM server 135 implement OMA-DM for remote DM.

DM client 118 may, among other things (such as, but not limited to, accessing and/or changing values of mobile device parameters for mobile device 111 relating to Wi-Fi configuration settings, Bluetooth configuration settings, network settings and the like), provide facilities for DM server 135 to remotely deliver (also referred to as over-the-air, or OTA, delivery) a software update (SU) or software updates (SUs) to mobile device 111. Other mobile devices 110 may also provide such facilities, although the particular implementations may vary. This may be referred to as over-the-air (OTA) delivery. An SU may include any code, firmware, objects, instructions, configuration settings, data, patches or the like to be rendered, installed, or otherwise executed on one or more of mobile devices 110. This data may be packaged for distribution as one or more software features, operating system features, device level component features, configuration settings, data files, bug fixes, or the like. OTA delivery of SUs allows manufacturers and operators to "push out" software (including firmware) and/or configuration upgrades to ensure that mobile devices 110 have the latest software and/or configuration improvements. In the example illustrated in FIG. 1, although mobile devices 116 do not support OTA delivery of SUs from OTA server 135 (for example, some of mobile devices 116 may not support any form of remote DM, or may not implement aspects of remote DM used by DM server 135 for OTA delivery of SUs), but the remainder of mobile devices 110 do support OTA delivery of SUs from OTA server 135.

The OMA has defined extension protocols for OMA-DM for OTA delivery of a SU to a mobile device, and in some examples some or all of these protocols may be implemented by OTA client 118 and OTA server 135. For firmware-over-the-air (FOTA) delivery of firmware, there is the FUMO (Firmware Update Management Object) specification, as discussed in the OMA Firmware Update Management Object Specification Version 1.0.2 (document OMA-TS-DM-FUMO-V1_0_2-20090828-A) and OMA Firmware Update Management Object Architecture Version 1.0 (document OMA-AD-FUMO-V1_0-20070209-A) which are both incorporated by reference herein in their entireties. For OTA delivery, installation, update, removal, activation, deactivation, and/or inventory of software components, there is the SCOMO (Software Component Management Object) specification, as discussed in the OMA Software Component Management Object Specification Version 1.0 (document OMA-TS-DM-SCOMO-V1_0-20111206-A) and OMA Software Component Management Object Architecture Version 1.0 (document OMA-AD-SCOMO-V1_0-20111206-A) which are both incorporated by reference herein in their entireties. Via OMA-DM, a mobile device 110 may determine an SU is available either as a result of a notification pushed by DM server 135 to mobile device 110 or as a result of the mobile device 110 polling DM server 135 and receiving an indication that the SU is available. In response to determining an SU is available, a mobile device 110 may download and apply the SU. Via OMA-DM, a software component for an SU may be downloaded directly from DM server 135, or DM server 135 may provide a reference (such as a URL) for retrieving the software component from a content server 140. DM client 118 and DM server 135 are not limited to implementing OMA-DM, FUMO, and/or SCOMO for remote DM; for example, mobile computing device manufacturers, operating system vendors, or MNOs may provide other protocols and interfaces that provide facilities for remote DM that may be adapted for use with the techniques described herein.

Upon determining an OTA SU is available, mobile device 110 may display the availability of the SU to a user on a display of mobile device 110. The user may select to download the SU immediately, at a later time, or decline the update altogether. If the user chooses to download the SU immediately, the SU may be downloaded OTA and stored in a memory of the mobile device 110. In some examples or circumstances, the download of the SU may be performed without user notification or involvement, such that the download of the SU may be transparent to the user. After the SU is downloaded, the SU may automatically be applied (which may include, for example, installation and/or modification of software components), or may be applied after confirmation by the user. DM client 118 may provide an SU application status to DM server 135 for the SU, such as an indication whether the SU was successfully applied or whether the user declined to apply the SU. The DM server 135 or a database associated therewith, such as database server 145, may record this status.

SU management server 130 is connected to MNO network 125, and is configured to interact with DM server 135 and database server 145 to obtain and/or maintain customer and device information, and control OTA SU operations performed by DM server 135. For example, SU management server 130 may obtain customer subscription and/or licensing information (including whether a customer is subscribed or licensed for use of SU management server 130) and/or mobile device subscription and/or licensing information (for example, an inventory of mobile devices associated with a customer). As another example, SU management server 130 may obtain mobile device parameter values from or for selected mobile devices; examples of mobile device parameters include, but are not limited to, a Mobile Device Number (MDN), a Mobile Equipment Identifier (MEID) (for 3G systems), an International Mobile Station Equipment Identity (IMEI for 3G systems), an International Mobile Subscriber Identity (IMSI for LTE systems), an integrated circuit card identifier (ICCID), a Make, a Model, an operating system version, and/or a firmware version. In interactions with DM server 135, SU management server 130 may receive notifications (such as a new MNO-provided SU being available), obtain information (such as information about mobile devices and SUs), manage SUs, perform DM operations (such as, but not limited to, obtaining information about software components installed on, or applied to, selected mobile devices 110, and obtaining and/or setting mobile device parameter values of selected mobile devices 110), and issue commands to DM server 135 to control delivery of SUs to mobile devices 110 (including, but not limited to, postponing availability of an SU for selected mobile devices 110 to a later time, and/or making a customer-provided SU available to selected mobile devices 110). Examples of such interactions will be discussed below.

Additionally, SU management server 130 is configured to provide one or more customer interfaces by which a customer, or a user associated with a customer, may control operation of SU management server 130 with respect to the mobile devices 110 associated with the customer. For example, via one or more of the customer interfaces, the first customer associated with mobile devices 112 may control availability of SUs to mobile devices 112. However, in many implementations an individual customer's control is limited to the mobile devices associated with the customer; for example, the first customer associated with mobile devices 112 would not be authorized to control operation of SU management server 130 with respect to mobile devices 114 associated with the second customer. A customer's control may be further limited to a subportion of the mobile devices associated with the customer; for example, mobile devices that have been licensed for such control. One or more user accounts may be created, maintained, and/or recognized for each customer authorized to utilize SU management server 130. These user accounts may be used in association with authentication with, and authorization within, SU management server 130. For example, user 156 may authenticate with SU management server 130 in association with a user account associated with the first customer, after which user 156 may control operation of SU management server 130 with respect to mobile devices 112. In some implementations, a first user account associated with a customer may create additional user accounts associated with the same customer. A first user account may selectively identify a portion of the mobile devices 110 it is authorized to manage, such as via the techniques discussed below for identifying groups of mobile devices, and instruct SU management server 130 to limit a second user account to managing the identified portion of mobile devices. A first user account associated with a customer may be authorized to perform certain operations (such as, but not limited to, creating additional users or uploading SUs) that a second user account associated with the customer is not authorized to perform.

One or more of the customer interfaces provided by SU management server 130 may be accessible to customer-operated computing devices, such as, but not limited to, customer computer 155 via data network 150 and/or mobile device 111 via mobile communications network 120. Data network 150 may be any local area network (LAN), metropolitan area network (MAN), wide area network (WAN), the Internet, or suitable packet-switched network, such as a commercially owned, proprietary packet-switched network. Although customer computer 155 is illustrated as a notebook or laptop device, customer computer 155 is not limited to such devices. In some examples, customer computer 155 may be provided by a server computer which may not include a display. In some examples, SU management server 130 may be configured to display a user interface (UI) on a computing device. For example, SU management server 130 may include one or more web server and/or web application server components configured to interact with a web browser application executing on customer computer 155 to display one or more UIs (user interfaces) that allow user 156 to control operation of SU management server 130. FIGS. 3-13 illustrate various examples of such UIs. The various features depicted in, or other such features described in connection with, FIGS. 3-13, and/or groups of those features, may be referred to as "UI elements." In some examples, a UI for controlling operation of SU management server 130 may be provided by an executable application or app; for example, an app specifically provided for controlling operation of SU management server 130. One or more of the customer interfaces provided by SU management server 130 may implement one or more network-accessible application programming interfaces (APIs). For example, the previously noted app may be configured to utilize such an API. In some implementations, a web application server (not illustrated in FIG. 1) may be configured execute instructions (such as instructions included in a web application program or programs) that display one or more UIs (such as, but not limited to, the examples illustrated in FIGS. 3-13) on a computing device, with the instructions using an interface provide by SU management server 130 to control operation of SU management server 130. Examples of various operations that may be performed via the customer interfaces, and examples of their effects, are discussed below. It is understood that the operations described below in connection with the UIs illustrated in FIGS. 3-13 may be performed via other non-UI interfaces provided by SU management server 130.

SU management server 130 may be configured to provide one or more interfaces for interacting with SU management server 130. Such interfaces may be used, for example, to notify SU management server 130 that a new SU is available, to notify SU management server 130 that a customer has been authorized or deauthorized to use SU management server 130, and/or to notify SU management server 130 that a mobile device has been associated or unassociated with a customer.

DM server 135 is connected to MNO network 125, and, as discussed above, is configured to perform OTA DM of mobile devices 110 via mobile communications network 120. DM server 135 may also be referred to as an "OTA server," a "FOTA server" (where, for example, DM server 135 is configured to perform OTA delivery of firmware updates), and/or a "software update server." As discussed above, some or all of mobile devices 110 (such as mobile device 111 including DM client 118) may be configured to interact with DM server 135 to allow remote DM by DM server 135. DM server 135 may implement OMA-DM protocols for remote DM. Via remote DM, DM server 135 may obtain mobile device parameter values from individual mobile devices 110. Such mobile device parameter values, and/or mobile device parameter values generated based on such information (for example, a mobile device parameter value may be converted to a human-readable value), may be recorded by DM server 135. Such mobile device parameter values may be provided to SU management server 130 and/or database server 145, and may be recorded by these servers. Additional mobile device parameters, in addition to mobile device parameters accessed via OTA DM, may be associated with mobile devices 110 and recorded by SU management server 130, DM server 135, and/or database server 145. DM server 135 may be configured to obtain such mobile device parameter values from a storage unit included in DM server 135, from database server 145, and/or via DM operations with mobile devices 110 for selected mobile devices 110 in response to commands received from other computer systems, such as SU management server 130. Via remote DM, DM server 135 may modify mobile device parameter values of mobile devices 110. Instructing a mobile device 110 to modify a mobile device parameter value may affect the behavior of the mobile device 110. DM server 135 may be configured to modify mobile device parameters in selected mobile devices 110 in response to commands received from other computer systems, such as SU management server 130. DM server 135 may perform remote DM operations with a mobile device 110 as part of a provisioning process, during which DM operations may be used to obtain mobile device parameter values from the mobile device 110 (which may be recorded) and set values for mobile device parameters of the mobile device 110.

As discussed above, DM server 135 may be configured to perform OTA management, delivery, and/or application of SUs to some or all of mobile devices 110. In some examples, DM server 135 may implement some or all of the OMA-DM FUMO (for firmware management) and/or SCOMO protocols (for software component management). As discussed above, content server 140 may be involved in delivering some or all SUs. Although FIG. 1 illustrates content server 140 as being connected to MNO network 125, in some examples content server 140 may instead be connected to data network 150 (although in some examples a DM client, such as DM client 118, may only allow SUs to be retrieved from predetermined "hardcoded" server addresses, or only from servers on MNO network 125). DM server 135 and/or SU management server 130 may be configured to store SUs (which may have been received from, for example, customer computer 155 or OEM computer 160) in content server 140. An SU may be prepackaged for delivery. An SU may be dynamically generated based on information obtained for a particular mobile device 110; for example, information indicating a first version of a software currently installed on a mobile device 110 may be used to generate a "diff" style SU based on differences between the first version and a second version of the software. An SU may perform a "rollback" for a newer software version or configuration to an older one. One or more mobile devices may be configured to In some examples, for a mobile device 110 that is not managed by SU management server 130, DM server 135 may be configured to determine whether an SU is available for the mobile device 110 based on a make and/or model of the mobile device 110. For example, a firmware update is often specific to a particular make and model of mobile device. For mobile devices which are managed by SU management server 130, such as mobile devices 112, SU management server 130 may issue commands to DM server 135 to assert control over which SUs are made available to particular mobile devices 112 and at what time SUs are made available to particular mobile devices 112. In general, in response to an SU being made available to a mobile device, the SU is provided and applied to the mobile device, although various circumstances may prevent and/or delay an SU from being applied to a mobile device even after it has been made available to the mobile device. In response to such commands, DM server 135 may record information (for example, in a storage device included in DM server 135 or in database server 145) in association with an identifier for a mobile device 110 (for example, an MDN of the mobile device 100), and DM server 135 may generate, or determine it should not generate, an indication to the mobile device 110 that an SU is available in response to the recorded information.

Database server 145 is connected to MNO network 125, and is configured to store information for, and make the stored information accessible to, various systems operated by the MNO, including, but not limited to, SU management server 130 and DM server 135. Database server 145 may store information relating to, for example, customers, service subscriptions and/or licenses for customers (including, for example, subscriptions and/or licenses for use of SU management server 130), mobile devices 110, mobile device parameter values, software that has been installed on, or applied to, mobile devices 110, associations between customers and mobile devices 110, user accounts, groups created via SU management server, MNO-provided SUs (including firmware), customer-provided SUs, SU schedules for groups, and/or SU requirements or dependencies. Mobile device parameter values for a mobile device 110, such as, but not limited to, one or more device identifiers, make information, and model information, may be initially stored in database server 145 as part of an initial activation or service provisioning (which may be performed by, for example, a customer service server and/or activation server (not illustrated in FIG. 1)) of the mobile device 110 with the MNO.

Each of the servers 130, 135, 140, and 145 may be implemented in a distributed fashion on a number of similar computing devices, such as to distribute processing loads. In this regard, for a large number of computing devices (for example, that may be distributed geographically) there may be one or more load balancers (not illustrated) to distribute processing activities across computing devices. Each of the servers 130, 135, 140, and 145 can be stand-alone servers or combined on a single server. Thus, the functionality described herein with respect to each of the servers 130, 135, 140, and 145 can also be provided by one or multiple different servers.

OEM computer 160 is connected to data network 150, and may be used by an OEM to indicate to the MNO that an SU, other components related to an SU, are available. In response to this indication, the MNO may identify a release time (where a time may be specified as a day and/or a day and time of day) for the SU (for example, after the MNO performs its own testing of the SU), register the SU with DM server 135 and/or SU management server 130, and may upload the SU to DM server 135 and/or content server 140. In some circumstances an MNO may generate a customized SU based on, for example, an OEM-provided SU or other OEM-provided components, and the customized SU may be registered with DM server 135 and/or SU management server 130, and may be uploaded to DM server 135 and/or content server 140. Customer computer 155 may be used to provide a customer-provided SU to the MNO. In response, the MNO may register the SU with DM server 135 and/or SU management server 130, and may upload the SU to DM server 135 and/or content server 140. An SU, such as an OEM-provided SU, an MNO-provided SU, or a customer-provided SU, may include criteria for mobile devices to which the SU is intended to be applied, or such criteria may be specified while providing the SU and associated with the SU. For example, an SU for updating a firmware is typically associated with a specific make and model of mobile device and criteria may be provided indicating that specific make and model. Such criteria may be used by DM server 135 and/or SU management server 130 to identify particular mobile devices 110 that are eligible for application of the SU.

Figure 2:
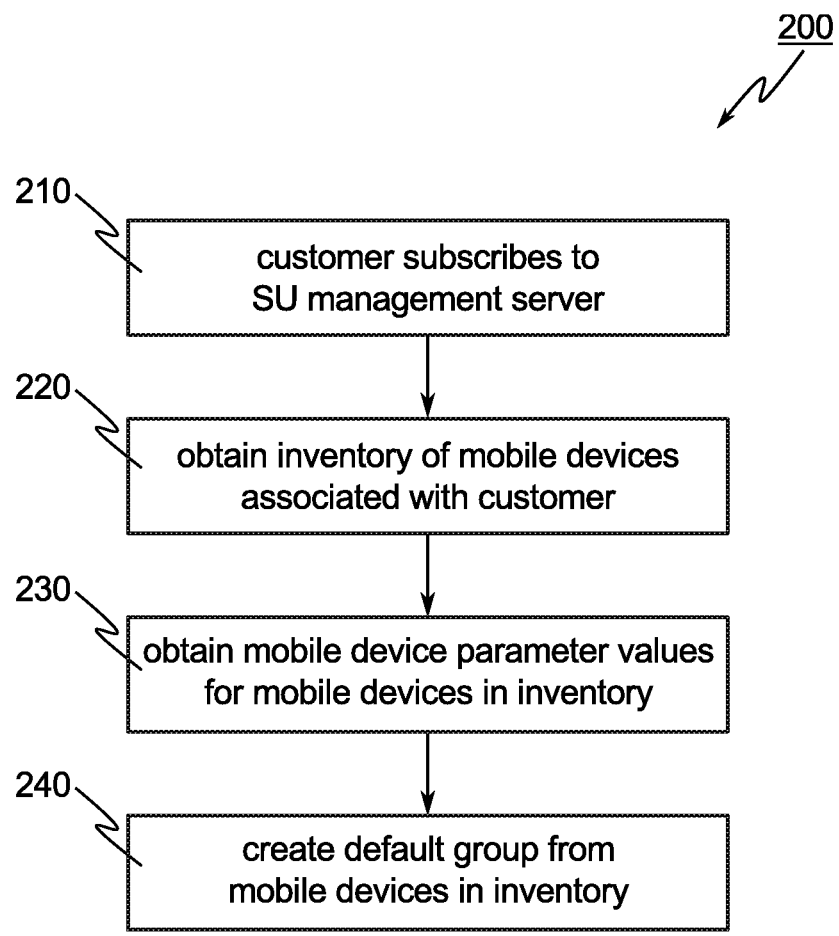
FIG. 2 illustrates an example of a method for enrolling a customer with an SU (software update) management server.

FIG. 2 illustrates an example of a method 200 for enrolling a customer with the SU management server 130. At step 210, a customer subscribes to, or is subscribed to, SU management server 130. One or more user accounts may be created in association with the customer in response to the customer subscribing to SU management server 130. One or more user accounts may be enabled or authorized to make use of features provided by SU management server 130 in response to the customer subscribing to SU management server 130. The customer and/or one or more user accounts associated with the customer may be selectively authorized to utilize various features available via SU management server 130. The customer may be an already existing customer that has chosen to begin making use of SU management server 130.

At step 220, an inventory of mobile devices associated with the customer is obtained. For example, SU management server 130 may obtain the inventory of mobile devices from database server 145 and/or DM server 135. The inventory may identify all or substantially all mobile devices associated with the customer. For example, for the first customer discussed with respect to FIG. 1, all of mobile devices 112 may be included in the inventory. Some of the mobile devices associated with the customer may not be included in the inventory. For example, mobile devices that do not implement OTA DM compatible with DM server 135 may be excluded from the inventory. As another example, mobile devices that do implement one or more OTA DM capabilities for SU management, such as, but not limited to, various capabilities provided by OMA-DM FUMO and/or OMA-DM SCOMO, may be excluded from the inventory. Although the inventory may already be recorded in a first database accessible via database server 145, in some examples an additional second database may be created and/or additional fields may be added to the first database to maintain information for additional mobile device parameters for the mobile devices included in the inventory.

At step 230, mobile device parameter values are obtained for mobile devices in the obtained inventory. Some or all of the mobile device parameter values may be obtained from database server 145. In some examples, SU management server 130 may obtain the mobile device parameter values via DM server 135, and DM server 135 may be configured to obtain a value for a parameter from a mobile device via OTA DM if a value for the parameter is not already recorded in DM server 135 or database server 145, or the recorded value is determined to be "stale." In some implementations, step 230 may not be performed, or may not be performed before step 240, and the mobile device parameter values may be obtained later, including "on demand" as needed by SU management server 130.

At step 240, a default group is created from the mobile devices included in the inventory. Information about the default group (which may include, but is not limited to, an identifier for each mobile device included in the default group, and/or mobile device parameter values for each mobile device included in the default group) may be recorded in SU management system 130 and/or database server 145. The default group may include all of the mobile devices included in the inventory obtained in step 220. The default group may exclude mobile devices based on the mobile device information obtained in step 230; for example, a mobile device that is determined to not implement certain OTA DM capabilities (which may be directly indicated by values for mobile device parameters obtained at step 230 that indicate which OTA DM capabilities are available, or indirectly (such as based on a make and/or model of the mobile device)) may not be included in the default group. The default group may be automatically given a name, such as "Default_Group". Some or all of the interfaces provided by SU management server 130 may be used with the default group as they would be with other groups. An initial UI screen may display information about the default group.

Figure 3:
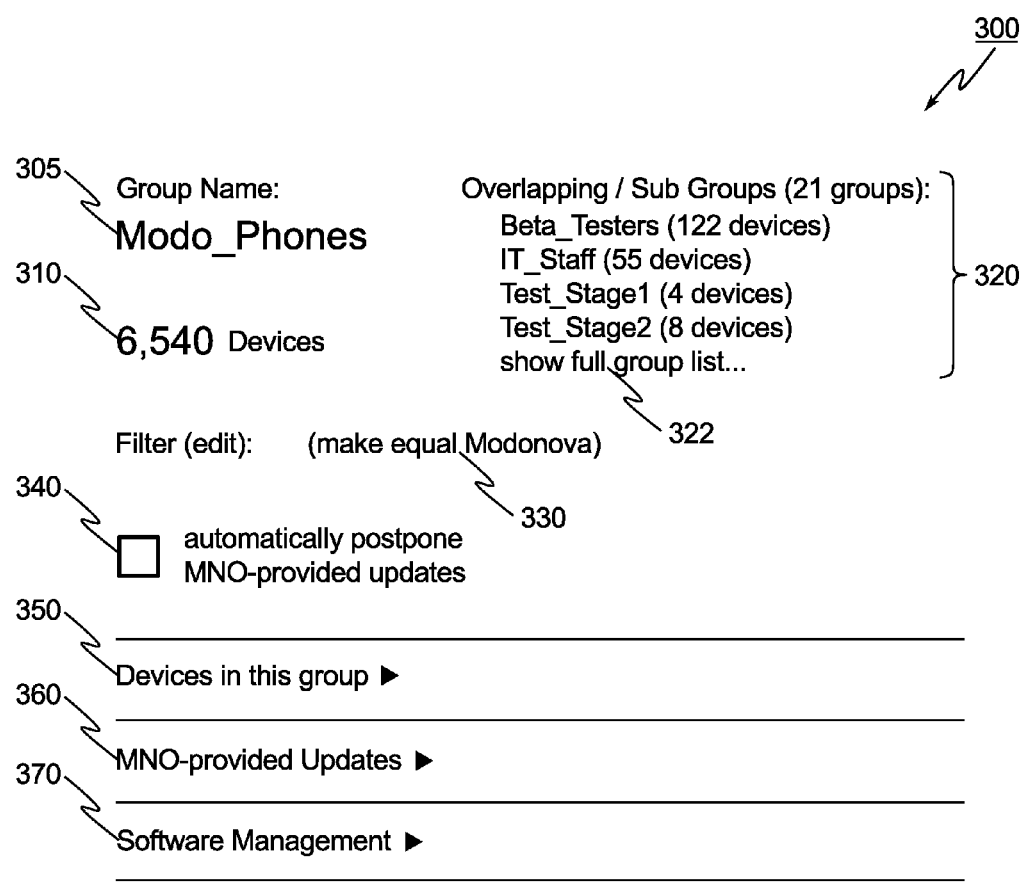
FIG. 3 illustrates an example of a UI (user interface) for performing group-related operations via a SU management server.

FIG. 3 illustrates an example of a UI 300 for performing group-related operations via SU management server 130. The UI 300, and the state of UI 300 illustrated in FIG. 3, may be displayed for providing an overview of a group of mobile devices. SU management server 130 allows groups of mobile devices, from among mobile devices associated with a customer, to be defined. In some examples, as discussed above, all of the mobile devices associated with a customer (or at least those which may be managed via SU management server 130) may be automatically associated with a default group. An individual mobile device may be associated with one or more groups. The term "overlapping groups" may be used to refer to a first group and a second group where one or more mobile devices are associated with both the first group and the second group. A first group is a "subgroup" of a second group where every mobile device that is associated with the first group is also associated with the second group. In some examples, a group may not currently be associated with any mobile devices (such a group may be referred to as an "empty" group). A group, or a portion of a group, may be defined dynamically in terms of properties of mobile devices that are to be associated with the group. Such groups may be referred to as "dynamic" groups. FIG. 3 illustrates a group criteria 330 that defines the dynamic group displayed in FIG. 3 (this particular group consists of all of the mobile devices associated with a customer with a mobile device parameter indicating a make of Modonova); such criteria are discussed in more detail below. A group, or a portion of a group, may be defined as a list of mobile devices (for example, by specifying an identifier for each mobile device in the list, such as, but not limited to, an MDN or an internal identifier generated by an MNO). An advantage of a dynamic group over a list-based group is that in response to a new mobile device being newly associated with a customer, the new mobile device may be automatically associated with a dynamic group (and settings for the dynamic group automatically applied for the new mobile device) without a user expressly associating the new mobile device with the dynamic group.

UI 300 displays a group name 305 for a group being displayed in UI 300. A group name may be automatically generated for a group when the group is created by SU management server 130. The group name 305 may be changed, such as by selecting the group name 305 in UI 300 and providing a new group name. UI 300 may display a mobile device count 310, indicating a number of mobile devices that are associated with the displayed group. UI 300 may display overlapping group information 320, displaying some or all of the other groups (possibly excluding a default group) associated with a customer or user that overlap with the group being displayed in UI 300. In the example illustrated in FIG. 3, there are 21 groups (ignoring any default group) that overlap with the group displayed in UI 300. A number of overlapping groups may be displayed, as illustrated in FIG. 3. In FIG. 3, for each of four of the overlapping groups, a name of an overlapping group and a number of mobile devices that are associated with both the overlapping group and the group displayed in UI 300 are displayed. Similar information may be displayed for the remaining 17 overlapping groups in response to a selection of expand element 322. In response to a selection of one the groups displayed in overlapping group information 320, a UI, such as UI 300, may be displayed for the selected group.

UI 300 may include a UI element that allows a user to review, specify, and/or modify a definition for the group displayed in UI 300. In the particular example illustrated in FIG. 3, the displayed group is a dynamic group that is defined by a group criteria 330. Group criteria 330 may be used to identify mobile devices that satisfy criteria 330 as being included in the group displayed in UI 300. Group criteria 330 is not limited to defining a dynamic group; for example, group criteria 330, or a portion of group criteria 330, may expressly identify a list of one or mobile devices to be included in (or excluded from) a group. To facilitate description of various examples of criteria such as group criteria 330, examples of text-based specifications of criteria are presented in this disclosure. The examples of syntax for text-based criteria illustrated in this disclosure is merely for the purpose of illustration, and is not intended as a formal syntax specification. It is understood that other techniques, such as graphical UIs, may be used for reviewing, specifying, and/or modifying criteria, including group criteria 330. Group criteria 330 may be modified by, for example, selecting the UI element in which it is displayed, in response to which a user may modify group criteria 330. UI 300 may be refreshed or dynamically updated in response to a user modifying group criteria 330, allowing the user to review the effect of the modification.

A criteria, such as group criteria 330, may be used to identify a set mobile devices from a plurality of mobile devices, such as which mobile devices are to be associated with a group. In some circumstances, the plurality of mobile devices a criteria is applied to or tested against may consist of mobile devices associated with a single user or customer; for example, generally group criteria 330 in FIG. 3 would not be used to identify mobile devices associated with other customers. In some circumstances, the plurality of mobile devices a criteria is applied to may consist of mobile devices associated with more than one customer; for example, SU management server 130 might generate an internal criteria used to identify mobile devices meeting certain criteria across all of the mobile devices managed by SU management server 130—regardless of which customer they are associated with.

One criteria that may be used is whether a value for a mobile device parameter meets an indicated requirement. As discussed elsewhere, a mobile device may be associated with multiple mobile device parameters having respective values for each mobile device. A mobile device parameter may be obtained from a mobile device, and in some circumstances set for a mobile device, via OTA. A mobile device parameter may be maintained in a database; for example, whether a particular feature is licensed and/or enabled for an individual mobile device may be recorded as a mobile device parameter. A mobile device parameter may have an associated name that may be used to specify parameter-based criteria. FIG. 3 illustrates an example of a parameter-based criteria, "(Make equal Modonova)", which matches positively for a mobile device having a value for the mobile device parameter named "Make" that is equal to the value specification "Modonova". Wildcards and/or regular expressions may be used for such parameter-based criteria, whether for identifying matching parameter names and/or values; for example, "(Model equal MR*)" may match against the values "MR100" and "MR222" for a Model parameter. The "equal" operator matches positively where a value is equal to (which may be case insensitive for strings) or matches a specification for a value (such as the above examples of "Modonova" and "(MR*)"). Other operators may be used, including, but not limited to, "not" (positive match where the value is not equal to or does not match a specification for a value), "lessThan" (positive match where the value is less than an indicated value), "lessThanEqual" (positive match where the value is less than or equal to an indicated value), "moreThan" (positive match where the value is more than an indicated value), and "moreThanEqual" (positive match where the value is more than or equal to an indicated value).

Examples of mobile device parameter value types may include strings and numeric values (including, but not limited to, integral and rational values). In some examples, handling specific to more complex data parameter value types may be implemented. For example, a data and/or time value may be used for a parameter, and time based comparisons may be used for criteria. For example, "(ActivationDate before 20XX-03-11)" may match positively with for mobile devices having a value for a mobile device parameter named "ActivationDate" indicating a time before March 11, 20XX. Time based operations may be performed against a current time. For example, "(FeatureExpires after TODAY)" or "(FeatureExpires after NOW)", in which "TODAY" (which might specify a current day) or "NOW" (which might specify a current day and time of day) is used to specify a current time, might be used to by a customer to implement a licensing scheme, where the "FeatureValues" parameter is a customer-created mobile device parameter, and the customer sets the value to correspond to the end of a support period provided by the customer for a mobile device.

In some implementations, a group-based criteria may be specified to identify mobile devices based on the groups that mobile devices are associated with. For example, "(GroupName equal TargetGroup)" may match positively for mobile devices associated with a group named "TargetGroup". Other operators, such as, but not limited to, the above "not" operator, wildcards, and/or regular expressions may be used to specify group-based criteria. In response to a group being deleted, a group-based criteria in a criteria may be replaced with a group criteria for the group being deleted. For example, a criteria of "(GroupName equal Modonova) and (Model equal MR*)" may be changed to "(Make equal Modonova) and (Model equal MR*)" if the group shown in the UI 300 were deleted.

As illustrated by various examples in this disclosure, criteria may include logical operations on other criteria, including logical combinations of other criteria, to create more complex and/or specific criteria specifications. For example "[criteria 1] and [criteria 2]" would positively match where both first and second criteria positively matched for a mobile device, "[criteria 1] or [criteria 2]" would positively match where either the first criteria or the second criteria positively matched for a mobile device, and "not [criteria 1]" would positively match where a first criteria does not positively match for a mobile device. Other logical operations include, but are not limited to, XOR, NAND, NOR, and XNOR. Although disjunctive logical combinations of parameter-based criteria, using a parameter having a unique value for each mobile device such as an MDN, may be used to identify a list of mobile devices; for example, "(MDN equal 1234567890) or (MDN equal 1234567891) or (MDN equal 1234567892)", a shorthand form, such as "(MDN list 1234567890 1234567891)" or "(MDN or 1234567890 1234567891)" may be provided to more compactly identify lists.

UI 300 may include a UI element 340, illustrated as a checkbox UI element in FIG. 3, which may be used to view and modify an automatic postponement setting for the group displayed in UI 300. In response to selection of UI element 340, the automatic postponement setting for the group may be changed; for example changed to an enabled or disabled state. In response to the automatic postponement setting being enabled for a group and a determination that a mobile device associated with the group is eligible to have an MNO-provided SU applied (for example, this may be determined based on criteria associated with the SU), availability of the SU may be automatically postponed. As a result, although an initial availability of the SU for the mobile device might have ordinarily occurred on a first time (for example, a release time associated with an SU, such as release time 828 illustrated in FIG. 8), the initial availability may instead be automatically postponed to a later second time. In some implementations, a user may specify an amount of time, such as a number of days, weeks, and/or months, by which availability will be automatically postponed; for example, this may be specified via an additional UI element (not illustrated in FIG. 3) included in UI 300. The user specified amount of time may apply to one or more groups. As discussed elsewhere in this disclosure, there are various circumstances in which an MNO-provided SU may be made available to a mobile device prior to a postponement—automatic or not—relating to the mobile device. In some implementations, a postponement of an MNO-provided SU, such as postponement 874 illustrated in FIG. 8, may be automatically created and associated with a group or automatically associated with the group in response to the automatic postponement setting being enabled for the group, an indication of a newly provided MNO-provided SU, and a determination that a mobile device associated with the group is eligible to have the SU applied. In some implementations, a postponement of an MNO-provided SU may be automatically created and associated with a group or automatically associated with the group in response to the automatic postponement setting being enabled for the group, a determination that a mobile device has been newly associated with the group (for example, due to a new mobile device being associated with a customer, or a new group criteria for a group includes the mobile device whereas a previous group criteria for the group did not), and a determination that the mobile device is eligible to have the SU applied.

Figure 4:
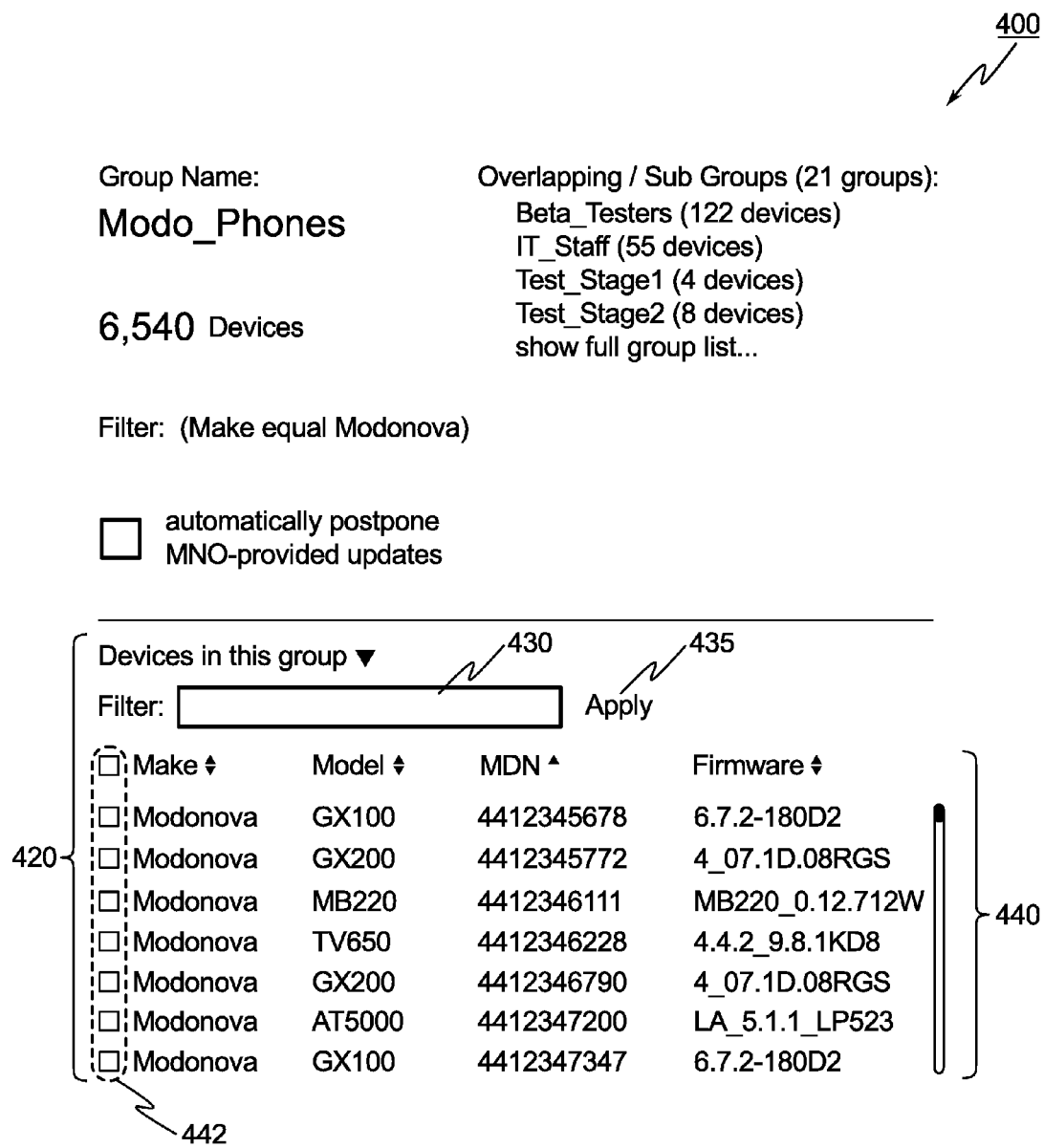
FIG. 4 illustrates an example of a UI including a device portion allowing a user to review mobile devices associated with the group displayed in the UI and issue commands relating to those mobile devices.
Figure 6:
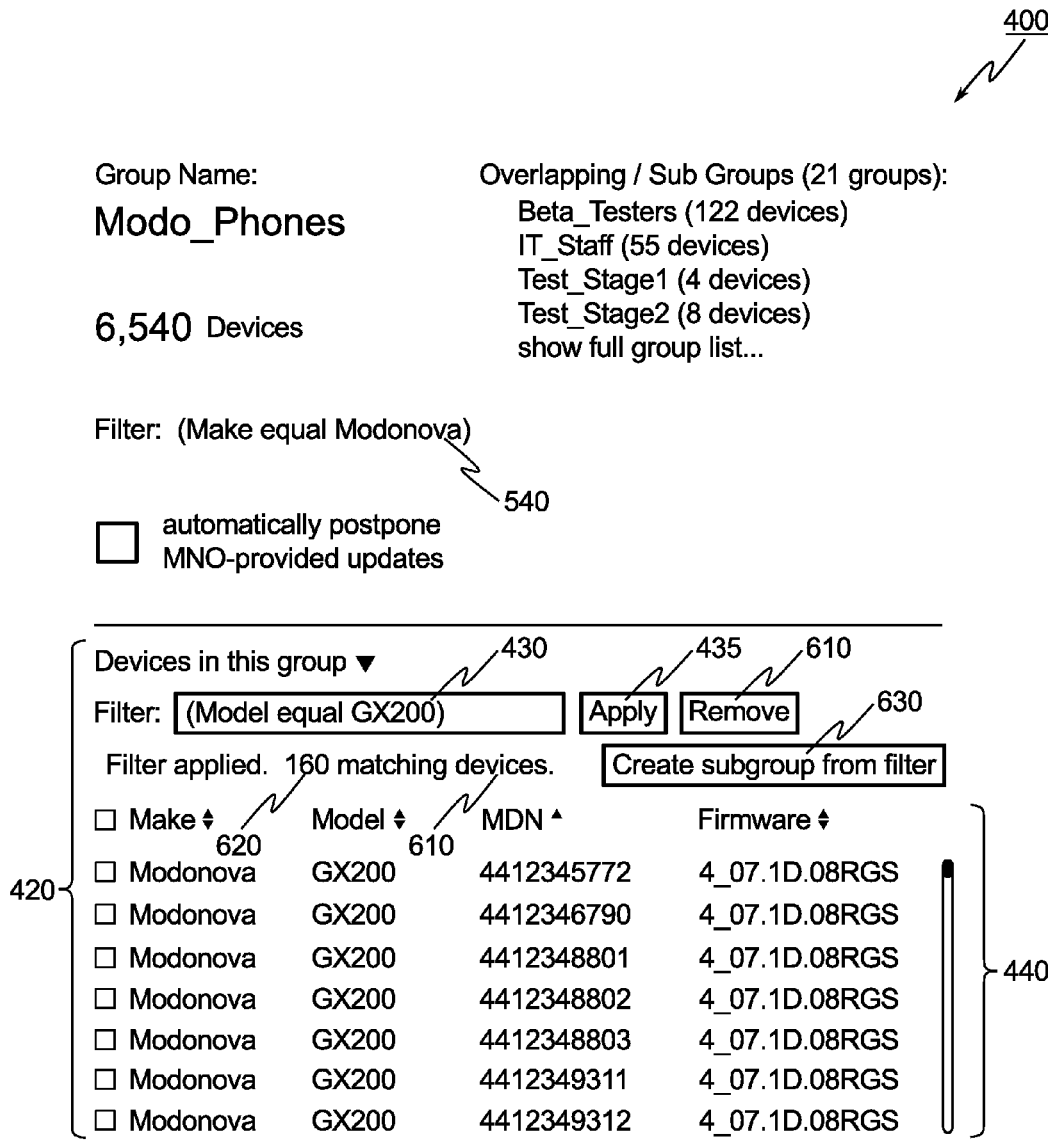
FIG. 6 illustrates an example of applying a secondary criteria to identify a subgroup of mobile devices associated with a group.
Figure 8:
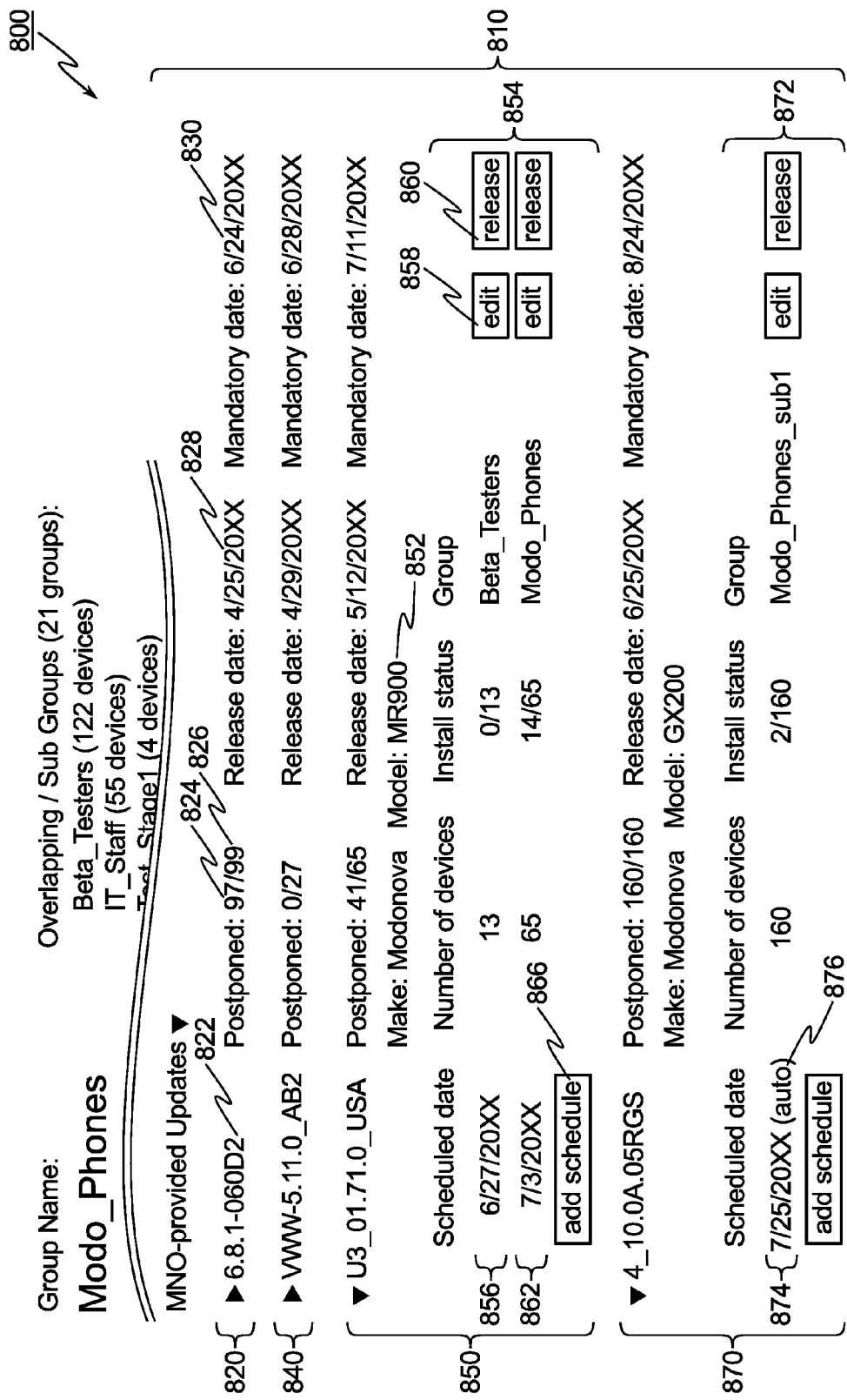
FIG. 8 illustrates an example of a UI including an MNO-provided SU portion enabling a user to utilize an SU management server to control when MNO-provided SUs are made available to mobile devices associated with the group displayed in the UI.
Figure 9:
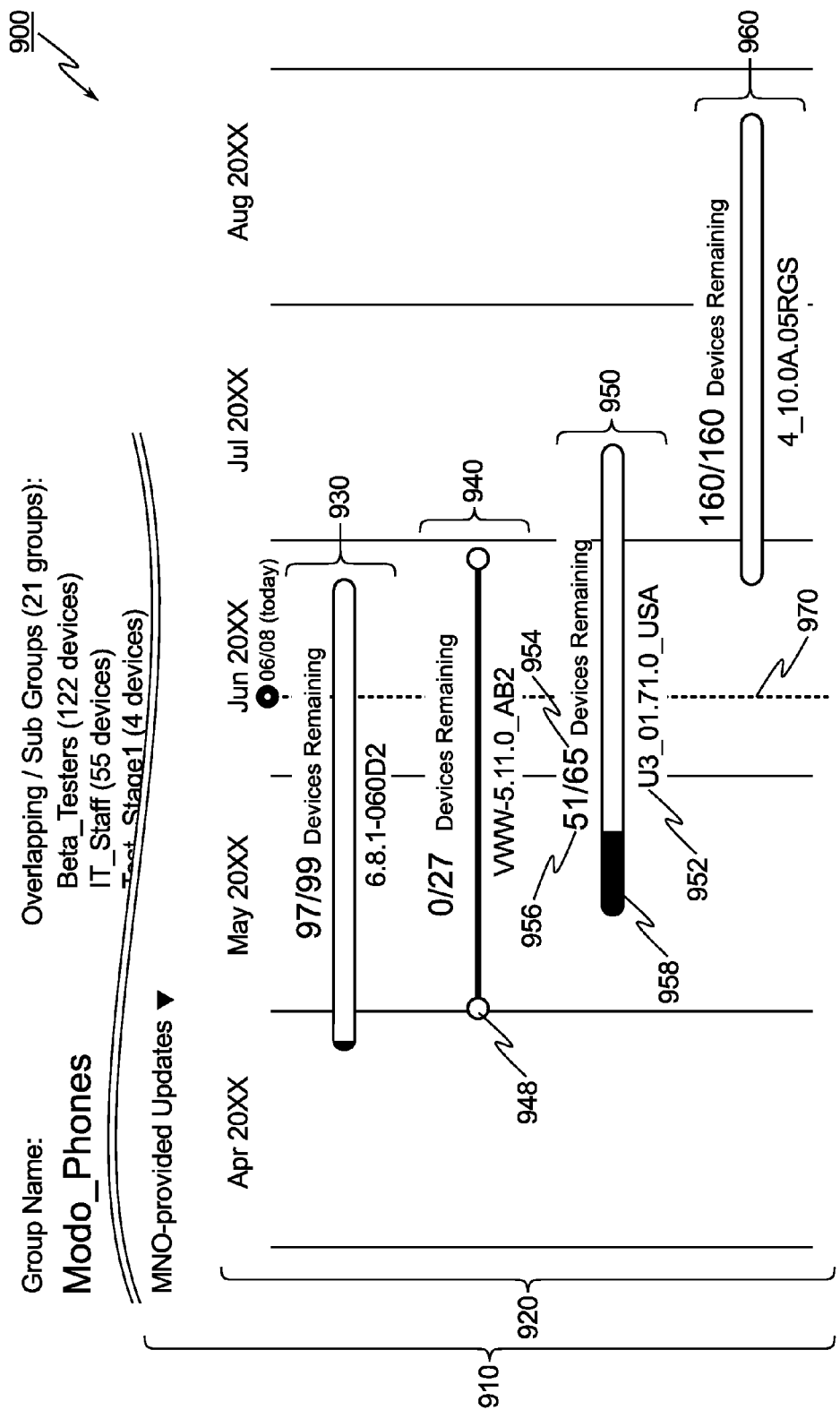
FIG. 9 illustrates an example of a UI including an MNO-provided SU portion enabling a user to utilize an SU management server 130 to control when MNO-provided SUs are made available to mobile devices associated with the group displayed in the UI.
Figure 11:
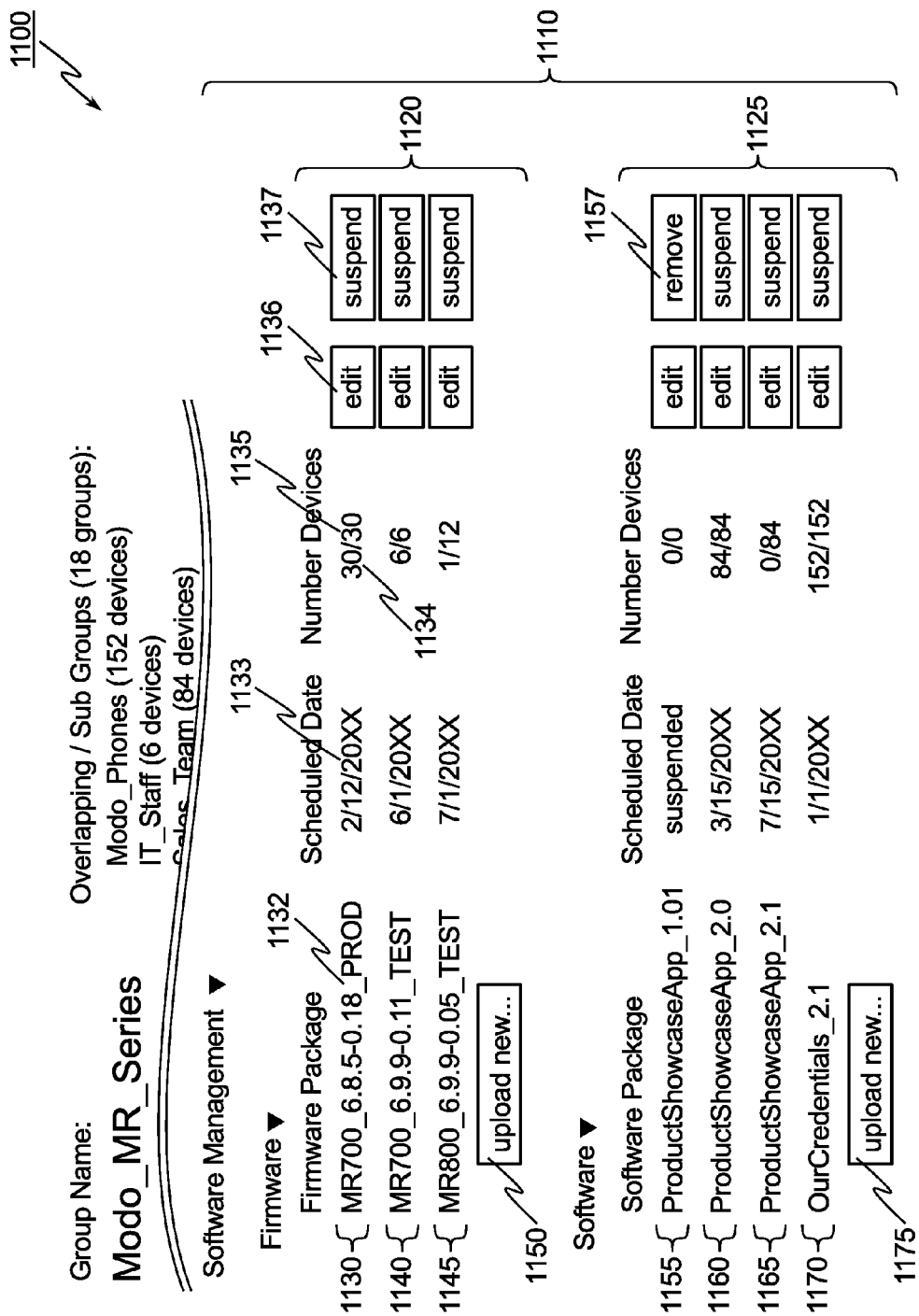
FIG. 11 illustrates an example of a UI including a customer-provided SU portion enabling a user to provide customer-provided SUs for OTA (over-the-air) delivery, manage customer-provided SUs, utilize an SU management server to control when customer-provided SUs are made available to mobile devices associated with the group displayed in the UI.

UI 300 may include a device portion 350, which is displayed in FIG. 3 in a collapsed view. Selection of device portion 350 may cause additional UI elements to be displayed in UI 300 (for example, device portion 350 may "expand" to accommodate additional UI elements) and/or another UI; FIGS. 4-6 illustrate examples of such UI elements. UI 300 may include an MNO-provided SU portion 360, which is displayed in FIG. 3 in a collapsed view. Selection of MNO-provided SU portion 360 may cause additional UI elements to be displayed in UI 300 (for example, MNO-provided SU portion 360 may "expand" to accommodate additional UI elements) and/or another UI; FIGS. 8 and 9 illustrate examples of such UI elements. UI 300 may include a customer-provided SU portion 370, which is displayed in FIG. 3 in a collapsed view. Selection of customer-provided SU portion 370 may cause additional UI elements to be displayed in UI 300 (for example, customer SU portion 370 may "expand" to accommodate additional UI elements) and/or another UI; FIG. 11 illustrates an example of such UI elements.

FIG. 4 illustrates an example of a UI 400 including a device portion 420 allowing a user to review mobile devices associated with the group displayed in UI 400 and issue commands relating to those mobile devices. The UI elements above device portion 420 are much the same as their counterparts 305, 310, 320, 330, and 340 in FIG. 3. UI 400, or at least the device portion 420 included therein, may be displayed in response to selection of device portion 350 in UI 300. Device portion 420 may include a secondary criteria entry field 430, into which a user may provide a secondary criteria specification for a subgroup of the group displayed in UI 400. In response to a user selecting apply secondary criteria button 435, the specified secondary criteria may be combined with the group criteria for the group displayed in UI 400 to display a subgroup of the mobile devices associated with the displayed group. FIG. 6 illustrates an example in which "(Model equal GX200)" has been specified in secondary criteria entry field 430, resulting in the initial listing of 6,540 mobile devices being narrowed down to a subgroup of only 160 devices. The mobile devices associated with the displayed subgroup may be identified by generating a conjunction of the group criteria for the group and the secondary criteria; in the example in FIG. 6, this might be "(Make equal Modonova) and (Model equal GX200)".

Device portion 420 may include a mobile device listing 440, which displays a listing of the mobile devices associated with the group displayed in UI 400. In the example illustrated in FIG. 4, mobile devices are arranged in rows, with each of the mobile devices associated with the group displayed in UI 400 having a respective row. In the example illustrated in FIG. 4, only 7 rows (and accordingly, mobile device parameter values for 7 mobile devices) are displayed at once in device portion 420, and a vertical scrollbar UI element is provided on the right hand side to allow scrolling through the 6,540 mobile devices associated with the group named "Modo_Phones". In the example illustrated in FIG. 4, mobile device parameters are arranged in columns; specifically, four such columns are displayed, with a Make parameter (indicating, for example, a manufacturer of a mobile device) in the first column, a Model parameter (indicating, for example, a model name and/or number for a mobile device) in the second column, an MDN parameter (a unique identifier for a mobile device) in the third column, and a firmware parameter (indicating, for example, a version identifier for a firmware currently installed on a mobile device) in the fourth column. UI 400 may allow a user to choose which mobile device parameters are displayed, and UI 400 may allow a user to specify a particular arrangement of the columns. UI 400 may allow a user to display additional columns of mobile device information, and may display a horizontal scrollbar UI element to scroll through the available columns. In some implementations, a user may, via UI 400 or another interface, specify one or more additional mobile device parameters for which values may be recorded in association with each of the mobile devices associated with a customer. For example, a parameter named "Department" with a string value may be used to record a department within a company that end users of mobile devices are associated with, and which allows for filtering (identifying mobile devices satisfying a criteria) by the recorded Department values. In some implementations, the order in which columns are displayed may be selectively rearranged by a user. In the example illustrated in FIG. 4, device portion 420 includes a header area 442 that displays a name for each displayed mobile device parameter. In some implementations, selection of one of the names or an associated UI element may allow for sorting (in ascending or descending order) the arrangement of the listing of mobile devices according the value for the parameter for each mobile device.

Mobile device listing 440 may include UI features which allow a user to identify a subgroup of the mobile devices associated with the group displayed in UI 400. In the example illustrated in FIG. 4, a checkbox UI element is provided on the left side of each row, allowing a user to select or deselect one or more of the mobile devices listed in device portion 420. A checkbox UI may also be provided in header area 442 that allows a user to selection or deselect all of the mobile devices associated with the group displayed in UI 400 with a single UI selection. Once one or more mobile devices have been selected, via the UI checkboxes or other techniques, various group-related actions may be performed, including, but not limited to, removing the selected mobile devices from the group displayed in UI 400, adding the selected mobile devices to an existing group, and/or creating a new group including the selected mobile device. For example, if the first two mobile devices shown in FIG. 4 (with MDNs 4412345678 and 4412345772) were selected, in response to a user requesting to remove the selected mobile devices from the displayed group, "and (MDN not 4412345678) and (MDN not 4412345772)" may be appended to the group criteria for the group, although a unique identifier other than MDN may be used. As another example, if the same two mobile devices were selected, in response to a user requesting to add the selected mobile devices to an existing group, "or (MDN equal 4412345678) or (MDN equal 4412345772)" may be appended to the group criteria for the existing group. In response to a mobile device being added to an existing group, settings for the existing group may be applied with respect to the newly added mobile device, such as causing a SU to be automatically applied to the newly added mobile device. As another example, if the same two mobile devices were selected, in response to a user requesting to create a new group including the selected mobile devices, a new group may be created with the group criteria "(MDN equal 4412345678) or (MDN equal 4412345772)".

FIG. 5 illustrates an example of using the device portion 420 of the UI 400 illustrated in FIG. 4 to perform actions relating to subgroups of mobile devices associated with a group. In the example illustrated in FIG. 5, a user may select (such as by performing a right click operation with a pointer device or a long tap operation on a touchscreen interface) one of the mobile device parameter values displayed in mobile device listing 440 to display a subgroup action UI element 510. Specifically, subgroup action UI element 510 is being displayed in response to the user having selected mobile device parameter value 505, indicating a value of "GX200" for the Model parameter for the mobile device with an MDN of 4412345772." Subgroup action UI element 510 may include a subgroup information display area 510 indicating the selected mobile device parameter (named "Model"), the selected value for the parameter ("GX200"), and a number of mobile devices associated with the group displayed in UI 400 that have the same value for the selected parameter (160 devices, in this example). Subgroup action UI element 510 may include one or more action UI elements, such as the illustrated action UI elements 520, 522, 524, 526, and 528. In response to a user selecting action UI element 520 (labeled "add to filter"), a secondary criteria may specified, or an already specified secondary criteria may be modified, in secondary criteria entry field 430. In the specific example illustrated in FIG. 5, the string "(Model equal GX200)" would be displayed in secondary criteria entry field 430, as illustrated in FIG. 6. This may provide a useful tool for a user to identify and test criteria to define dynamic groups. In response to a user selecting action UI element 522 (labeled "select"), the checkbox UI elements for each mobile device having the selected value for the parameter may be selected. In response to a user selecting action UI element 524 (labeled "remove from this group"), the group criteria for the group displayed in UI 400 may be modified to exclude mobile devices having the selected value for the selected parameter. In the specific example illustrated in FIG. 5, "and (Model not GX200)" may be appended to group criteria 540, yielding the criteria "(Make equal Modonova) and (Model not GX200)" and a group associated with 6,380 mobile devices. In response to a user selecting action UI element 526 (labeled "create new subgroup . . . "), a new subgroup may be created based on the group criteria 540 for the group displayed in UI 400 and the selected parameter and value. For the specific example illustrated in FIG. 5, the group illustrated in FIG. 7 may be the result of the user selecting action UI element 526. In response to a user selecting action UI element 528 (labeled "add to existing group . . . "), a group criteria for an existing group may be modified based on the group criteria 540 for the group displayed in UI 400 and the selected parameter and value. For the specific example illustrated in FIG. 5, if an existing group had a group criteria of "(Make equal Simsong)", the group criteria may be modified to "(Make equal Simsong) or ((Make equal Modonova) and (Model equal GX200))". It is noted that dynamic groups, relating to a value of a parameter, are specified by the criteria resulting from selection of action UI elements 520, 524, 526, and 528—for example, by specifying "(Model equal GX200)" or "(Make equal Modonova) and (Model equal GX200)", rather than list-based groups enumerating individual mobile devices.

FIG. 6 illustrates an example of applying a secondary criteria to identify a subgroup of mobile devices associated with a group. In the example illustrated in FIG. 6, a secondary criteria of "(Model equal GX200") has been specified in secondary criteria entry field 430. A user may specify or modify a value of secondary criteria entry field 430 via, for example, a keyboard. Additionally, as discussed above, in response to a user selecting action UI element 520 in FIG. 5, a secondary criteria may specified, or an already specified secondary criteria may be modified, in secondary criteria entry field 430. FIG. 6 illustrates an example consistent with action UI element 520 in FIG. 5 having been selected and apply secondary criteria button 435 having been selected to apply the secondary criteria. As a result, a temporary subgroup criteria may be generated based on, such as by conjoining, the group criteria 540 for the group displayed in UI 400 and the secondary criteria in secondary criteria entry field 430; in the particular example illustrated in FIG. 6, such a temporary subgroup criteria might be "(Make equal Modonova) and (Model equal GX200)". When the secondary criteria is applied (for example, in response to selecting apply secondary criteria button 435), the mobile devices listed in mobile device listing 440 may be limited to the mobile devices in the resulting subgroup, device portion 420 may indicate a number 620 of mobile devices associated with the resulting subgroup, and a remove secondary criteria button 610 may be displayed. In response to a user selecting remove secondary criteria button 610, the secondary criteria specified in secondary criteria entry field 430 may be no longer applied (although it may continue to be indicated in secondary criteria entry field 430); in the particular example illustrated in FIG. 6, this would result in the number of mobile devices listed in mobile device listing 440 increasing from 160 mobile devices associated with the subgroup indicated in secondary criteria entry field 430 to the 6,540 mobile devices associated with the group displayed in UI 400. Device portion 420 may include one or more subgroup action UI elements having effects similar to action UI elements 524 ("remove from this group"), 526 ("create new subgroup . . . "), and 528 ("add to existing group . . . "). For example, in response to a user selecting create subgroup button 630, a new group may be created with a group criteria based on group criteria 540 for the group displayed in UI 400 and the secondary criteria specified in secondary criteria entry field 430. FIG. 7 illustrates an example of a new group that may be created in response to selection of create subgroup button 630 with UI 400 is the state illustrated in FIG. 6.

FIG. 7 illustrates an example of a UI 700 for performing group-related operations via SU management server 130, in which the group displayed in FIG. 7 is a subgroup created from the group illustrated in FIG. 4. As discussed above, this subgroup may have been created via, for example, selection of action UI element 526 ("create new subgroup . . . ") illustrated in FIG. 5 or selection of create subgroup button 630 illustrated in FIG. 6. The name for the group displayed in UI 700 may have been automatically generated from a group from which the displayed subgroup was created; for example, the string "_sub1" may have been automatically appended to the group name of "Modo_Phones" for the group displayed in UI 400. UI 700 operates in much the same manner as UI 300 illustrated in FIG. 3, including, in some implementations, access to additional UIs such as the UIs illustrated in FIGS. 4-6 and 8-13. In the particular example illustrated in FIG. 7, an automatic postponement setting for the group displayed in UI 700 is enabled, as indicated by UI element 710 (which operates in much the same manner as UI element 340 illustrated in FIG. 3).

FIG. 8 illustrates an example of a UI 800 including an MNO-provided SU portion 810 enabling a user to utilize SU management server 130 to control when MNO-provided SUs are made available to mobile devices associated with the group displayed in the UI 800. MNO-provided SU portion 810 may include one or more listings of MNO-provided SU items, in which each of the listed items is eligible to be applied to one or more of the mobile devices associated with the group displayed in UI 800. In some implementations, SU server 135 may provide an indication that one or more mobile devices are eligible for an MNO-provided SU. In the particular example illustrated in FIG. 8, a single listing consisting of four MNO-provided SU items 820, 840, 850, and 870. For the examples illustrated in FIGS. 8 and 9, the current time is 6/8/20XX (June 8, 20XX). It is noted that MNO-provided SUs are not limited to firmware updates. In some implementations, MNO-provided SU portion 810 may include a first listing for firmware updates and a different listing for other SUs. In some implementations, MNO-provided SU portion 810 may include a first listing for SUs that have already been applied to all eligible mobile devices and a different listing for other SUs. One or more MNO-provided SUs may be designated, for example by the MNO, as mandatory for application (for example, for security purposes). Depending on the number of MNO-provided SU items for a group, how they are displayed, and the available display space, vertical and/or horizontal scrollbar UI elements may be included in MNO-provided SU portion 810.

As noted previously, an SU may be associated with one or more eligibility criteria for identifying eligible mobile devices to which the SU is intended to be applied. For example, an SU including a firmware update may be associated with eligibility criteria identifying a particular make and model of mobile device. A criteria may be generated for, and associated with, an SU based on the eligibility criteria associated with the SU; for example, an SU for a firmware update for a Modonova GX200 may be associated with a criteria "(Make equal Modonova) and (Model equal GX200)". It is noted that individual SUs may only be eligible for some, but not all, of the mobile devices associated with a group, as is illustrated by the example SU items in FIG. 8.

Figure 10:
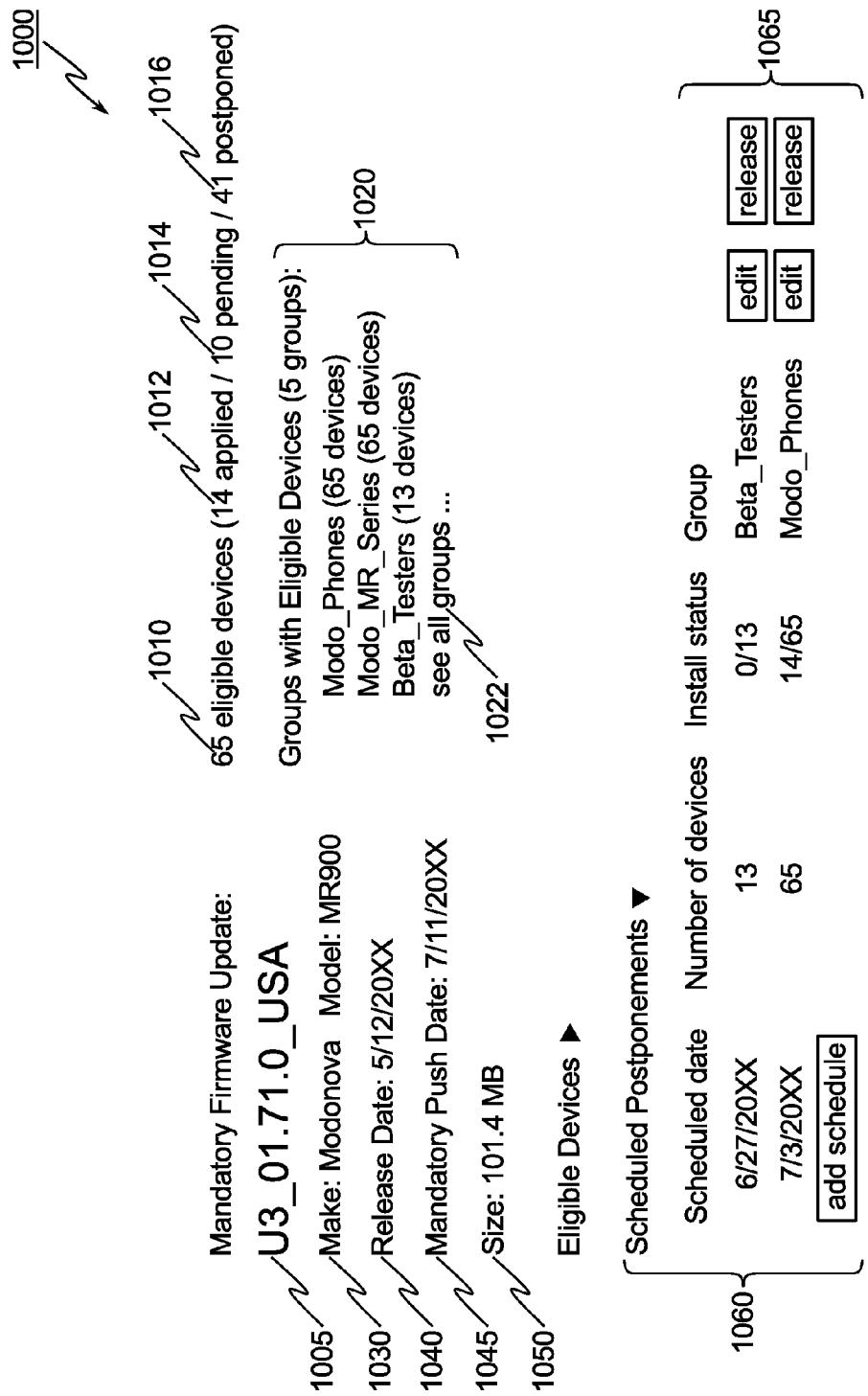
FIG. 10 illustrates an example of a UI providing a detail view for an MNO-provided SU.

In FIG. 8, MNO-provided SU items 820 and 840 are each displayed in a compressed mode, and MNO-provided SU items 850 and 870 are each displayed in an expanded mode showing additional information. MNO-provided SU item 820 may display an SU identifier 822. In some implementations, a user may modify an identifier for an SU from an MNO-provided identifier via UI 800 or another interface (for example, UI 1000 illustrated in FIG. 10). In response to a user selecting SU identifier 822, a detail view for the corresponding SU may be displayed. FIG. 10 illustrates an example of such a detail view for MNO-provided SU item 850. MNO-provided SU item 820 may display a number 826 of the mobile devices associated with the group displayed in UI 800 that are eligible to receive the corresponding SU. MNO-provided SU item 820 may display a number 824 of the number 826 of mobile devices for which availability of the SU has been postponed. MNO-provided SU item 820 may display a release time 828 for the corresponding SU. Release time 828 may indicate a time the corresponding SU will first be made available to eligible mobile devices unless availability for a mobile device has been postponed (for example, via a postponement such as the three postponements illustrated in FIG. 8) or a user has requested the SU be made available to a mobile device (such as requesting the SU be made available to a mobile device before the release time for testing). MNO-provided SU item 820 may display a mandatory time 830 for the corresponding SU. Mandatory time 830 may indicate a time specified by the MNO beyond which a user may not postpone the SU. In some implementations, SU management server 130 may provide an interface allowing mandatory time 830 to be adjusted for selected customers. As illustrated in FIG. 8, MNO-provided SU items 840, 850, and 870 may also display UI elements corresponding to the UI elements displayed in MNO-provided SU item 820.

In addition to those UI elements, MNO-provided SU item 850 may display one or more criteria associated with the SU corresponding to MNO-provided SU item 850; for example, mobile devices having a Make of Modonova and Model of MR900 are eligible to receive the SU corresponding to MNO-provided SU item 850 illustrated in FIG. 8. MNO-provided SU item 850 may display a postponement schedule 854 including postponements associated with the corresponding SU and affecting one or more mobile devices associated with the group displayed in UI 800. In FIG. 8, two postponements 856 and 862 are illustrated. Each postponement may be associated with one or more groups, and may the groups associated with a postponement may be displayed; for example, as illustrated in FIG. 8, postponement 856 is associated with a group named Beta_Testers, and postponement 862 is associated with a group named Modo_Phones (the group displayed in UI 800). Each postponement may display a scheduled time associated with the postponement, indicating when the postponement ends and the corresponding SU may be made available (although another postponement may cause the SU to remain unavailable). Each postponement may display a number of mobile devices associated with the group displayed in UI 800 for which the postponement applies (these mobile devices may be considered "associated" with the respective postponement); for example, postponement 856 applies to 13 eligible mobile devices (a number of mobile devices that are associated with the group name Modo_Phones displayed in UI 800, associated with the group named Beta_Testers associated with postponement 856, and also eligible to receive the corresponding SU). Postponement 856 may include an edit button 858, and in response to a user selecting edit button 858 the user may edit details of postponement 856, such as, but not limited to, a scheduled time for the postponement or which group or groups are associated with the postponement. Postponement 856 may include a release button 860, and in response to a user selecting release button 860 the corresponding SU may be currently made available to the mobile devices to which postponement 856 applies (in effect using the current time or an earlier time as the scheduled time), allowing an SU to be made available to a group at an earlier time, such as in response to acceleration of a release schedule for that group. In some circumstances, in response to a user selecting release button 860 the corresponding SU may be made available to a mobile device prior to a release time for the SU (such as release time 828 illustrated in FIG. 8). Each postponement may display a number indicating on how many of the mobile devices to which a postponement applies the corresponding SU has actually been applied. As noted previously, a mobile device may indicate to SU server 135 when an SU has been applied successfully, and such information may be used to generate the displayed number. MNO-provided SU item 850 may include an add postponement button 866, and in response to a user selecting add postponement button 866, a new postponement may be created which is associated with the group displayed in UI 800 and associated with the corresponding SU. As illustrated in FIG. 8, MNO-provided SU item 870 may also display UI elements corresponding to the UI elements displayed in MNO-provided SU item 850. As illustrated for postponement 874 displayed for MNO-provided SU item 870, an indication 876 may be displayed to indicate that a postponement and/or a scheduled time for a postponement was automatically scheduled.

In some circumstances a mobile device may be associated with two or more postponements with different times; in the example illustrated in FIG. 8, each of the devices associated with postponement 856 (with a scheduled time of 6/27/20XX) are also associated with postponement 862 (with a scheduled time of 7/3/20XX). Various techniques may be used to determine which scheduled time is used for such mobile devices. A scheduled time may be used for a mobile device based on it being the earliest of the scheduled times associated with the mobile device. A scheduled time may be used for a mobile device based on it being the latest of the scheduled times associated with the mobile device. A first associated scheduled time may be used for a mobile device instead of a second associated scheduled time based on the first scheduled time having been provided before the second scheduled time. A first associated scheduled time may be used for a mobile device instead of a second associated scheduled time based on the first scheduled time having been provided after the second scheduled time. A first scheduled time associated with a first group may be used instead of a second scheduled time associated with a second group based on the first group being a subgroup of the second group.

FIG. 9 illustrates an example of a UI 900 including an MNO-provided SU portion 910 enabling a user to utilize SU management server 130 to control when MNO-provided SUs are made available to mobile devices associated with the group displayed in the UI 900. MNO-provided SU portion 910 includes a graphical calendar-based view 920 of one or more MNO-provided SU items, in which each of displayed items is eligible to be applied to one or more of the mobile devices associated with the group displayed in UI 900. The example illustrated in FIG. 9 relates to the same circumstances illustrated in FIG. 8, but uses a graphical approach, rather than a text-based approach, to presenting some of the information presented in FIG. 8.

In the particular example illustrated in FIG. 9, four MNO-provided SU items 930, 940, 950, and 960 (respectively corresponding to MNO-provided SU items 820, 840, 850, and 870 illustrated in FIG. 8) are displayed in view 920. Depending on the number of MNO-provided SU items for a group, how they are displayed, and the available display space, vertical and/or horizontal scrollbar UI elements may be included in view 920. MNO-provided SU item 950 may display an SU identifier 952. In some implementations, a user may modify an identifier for an SU from an MNO-provided identifier via UI 900 or another interface (for example, UI 1000 illustrated in FIG. 10). In response to a user selecting SU identifier 952, a detail view for the corresponding SU may be displayed. FIG. 10 illustrates an example of such a detail view for MNO-provided SU item 950. MNO-provided SU item 950 may display a number 954 of the mobile devices associated with the group displayed in UI 900 that are eligible to receive the corresponding SU. MNO-provided SU item 950 may display a number 956. In some examples, as illustrated in FIG. 9, number 956 may indicate how many of the number 954 of mobile devices have not had the corresponding SU applied. As noted previously, a mobile device may indicate to SU server 135 when an SU has been applied successfully, and such information may be used to generate the number 956. In some examples, number 956 may indicate an amount of the number 954 of mobile devices for which availability of the corresponding SU has been postponed.

MNO-provided SU item 950 may include a graphical status indicator 958. In the example illustrated in FIG. 9, status indicator 958 is displayed as a horizontally oriented bar. In some implementations, a first end or a first graphical element included in status indicator 958 of status indicator 958 may be displayed at a position corresponding to a release time for the corresponding SU, which, much like release time 828 in FIG. 8, may indicate a time on which an eligible mobile device may be notified of the availability of the corresponding SU unless availability of the SU to the mobile device has been postponed. In the particular example of MNO-provided SU item 950 illustrated in FIG. 9, a left end of status indicator 958 is positioned at, or approximately at, a horizontal position corresponding to a release time of May 12, 20XX for the SU. In some implementations, a second end of status indicator 958, which may be opposite from the first end, or a second graphical element included in status indicator 958 may be displayed at a position corresponding to a mandatory time for the corresponding SU, which, much like mandatory time 830 in FIG. 8, may indicate a time specified by the MNO beyond which a user may not postpone the SU. In the particular example of MNO-provided SU item 950 illustrated in FIG. 9, a right end of status indicator 958 is positioned at, or approximately at, a horizontal position corresponding to the mandatory time of July 11, 20XX for the SU. Accordingly, status indicator 958 may provide a useful and concise visual indication of a release time and a mandatory time for SUs. In some examples, a graphical indicator (not illustrated in FIG. 9) may be included in status indicator 958 or MNO-provided SU item 950 which is displayed at a position corresponding to a scheduled time for a postponement of the corresponding SU. View 920 may include a graphical current time indicator 970 displayed at a position corresponding to a current time (for example, today's date). In the example illustrated in FIG. 9, current time indicator includes a vertical line at a horizontal position corresponding to a current time of June 8, 20XX, with an accompanying textual display of the current time.

In some examples, status indicator 958 may include a graphical indication of a portion of the number 954 of mobile devices to which the corresponding SU has been successfully applied. In the example illustrated in FIG. 9, status indicator 958 includes a shaded portion having a width in relation to a total width of status indicator 958 that is approximately proportionate to the portion of the number 954 of mobile devices to which the corresponding SU has been successfully applied (14 out of 65, or approximately 22%). In some examples, status indicator 958 may include a graphical indication of a portion of the number 954 of mobile devices to which the corresponding SU has not been successfully applied. In the example illustrated in FIG. 9, status indicator 958 includes an unshaded portion having a width in relation to a total width of status indicator 958 that is approximately proportionate to the portion of the number 954 of mobile devices to which the corresponding SU has not been successfully applied (51 out of 65, or approximately 78%). In some examples, status indicator 958 may include a graphical indication (not illustrated in FIG. 9) of a portion of the number 954 of mobile devices which are currently postponed. For the example illustrated in FIG. 9, this might be displayed with a portion of status indicator 958 having a width in relation to a total width of status indicator 958 that is approximately proportionate to the portion of the number 954 of mobile devices which are currently postponed (41 out of 65, or approximately 63%). In some examples, status indicator 958 may include a graphical indication (not illustrated in FIG. 9) of a portion of the number 954 of pending mobile devices for which the corresponding SU has been made available, but the SU has not yet been successfully applied to them; this may occur for various reasons, such as, but not limited to, a mobile device not having received the SU, a mobile device not yet having received an indication that the SU is available, and/or a user declining or deferring installation of an SU. For the example illustrated in FIG. 9, this might be displayed with a portion of status indicator 958 having a width in relation to a total width of status indicator 958 that is approximately proportionate to the portion of the number 954 of mobile devices which are pending (10 out of 65, or approximately 15%).

As illustrated in FIG. 9, MNO-provided SU items 930, 940, and 970 may each also include the features described above for MNO-provided SU item 950. Graphical status indicator 958 included in MNO-provided item 940 has a different appearance than MNO-provided SU items 930, 950, and 970; this different appearance provides a visual indication to a user that the SU corresponding to MNO-provided SU item 940 has been successfully applied to all of the mobile devices associated with the group displayed in UI 900 that are eligible to receive the corresponding SU.

FIG. 10 illustrates an example of a UI 1000 providing a detail view for an MNO-provided SU. In the specific example illustrated in FIG. 10, UI 1000 is displaying information for the MNO-provided SU corresponding to MNO-provided SU item 850 illustrated in FIG. 8 and MNO-provided SU item 950 illustrated in FIG. 9. UI 1000 displays an SU identifier 1005 for the SU being displayed in UI 1000. In some implementations, a user may specify a new SU identifier to replace an MNO-provided SU identifier and/or provide an alternate SU identifier, with the new SU identifier used to identify the SU for that user or a customer associated with the user. For example, SU identifier 1005 may be changed by selecting the SU identifier 1005 and providing a new SU identifier. UI 300 may display an eligible device count 1010, indicating a number of mobile devices associated with a customer that are eligible for the SU displayed in UI 1000 (the "eligible mobile devices," in this description of FIG. 10). UI 1000 may display an applied device count 1012, indicating a number of the eligible mobile devices to which the SU displayed in UI 1000 has been applied. UI 1000 may display a pending device count 1014, indicating a number of the eligible mobile devices for which the SU displayed in UI 1000 has been made available, but the SU has not yet been successfully applied to them. UI 300 may display postponed device count 1016, indicating a number of the eligible mobile devices for which availability of the SU displayed in UI 1000 has been postponed. UI 1000 may display associated group information 1020, displaying some or all groups (possibly excluding a default group) each associated with one or more of the eligible mobile devices (such groups may be referred to as being "associated" with the SU). In the example illustrated in FIG. 10, there are five groups (ignoring any default group) associated with the SU displayed in UI 1000. A number of groups associated with the SU may be displayed, as illustrated in FIG. 10. In FIG. 10, for each of three of the groups associated with the SU, a name of the group and a number of the eligible mobile devices that are associated with the group are displayed. Similar information may be displayed for the remaining two groups associated with the SU in response to a selection of expand element 1022. In response to a selection of one the groups displayed in associated group information 1020, a UI, such as UI 300, may be displayed for the selected group.

UI 1000 may display criteria 1030 associated with the SU displayed in UI 1000. In the particular example illustrated in FIG. 10, criteria 1030 indicate that the SU displayed in UI 1000 is intended for mobile devices of a particular Make (Modonova) and Model (MR900). As mentioned previously, a criteria may be generated for, and associated with, as SU based on eligibility criteria associated with the SU. For the particular example illustrated in FIG. 10, a criteria of "(Make equal Modonova) and (Model equal MR900)" might be generated. UI 1000 may display such a criteria. In some examples, eligibility criteria associated with an SU may not be provided to SU management server 130. For example, DM server 135 or another system other than SU management server 130 may obtain criteria associated with an SU, and DM server 135 may identify zero or more mobile devices (whether limited to a single specified customer, limited to a specified plurality of customers, or for all customers) eligible for the SU, and a list or other indication of the identified eligible mobile devices may be provided to SU management server 130.

UI 1000 may display a release time 1040 for the SU displayed in UI 1000. Release time 1040 is much like release time 828 discussed in connection with FIG. 8. The release time 1040 may be specified and/or modified by the MNO. Multiple release times may be associated with an SU, with each release time corresponding to one or more customers. UI 1000 may display a mandatory time 1045 for the SU displayed in UI 1000. Mandatory time 1045 is much like mandatory time 830 discussed in connection with FIG. 8. The mandatory time 1045 may be specified and/or modified by the MNO. Multiple mandatory times may be associated with an SU, with each mandatory time corresponding to one or more customers. UI 1000 may include a UI element (not illustrated in FIG. 10) allowing a user to request mandatory time 1045 be modified by the MNO for the user or customer. UI 1000 may display a size, with may be an estimated size, for an amount of data transferred in connection with applying the SU to a mobile device (for example, a size or total size of one or more software components downloaded to a mobile device). UI 1000 may include postponement display region 1060 including a postponement schedule 1065, which operates in much the same manner as postponement schedule 854 discussed above in connection with FIG. 8, although postponement schedule 1065 relates to all eligible mobile devices for the SU instead of the eligible mobile devices associated with a particular group.

As noted previously, SU management server 130 may receive an indication (for example, a notification from SU server 135) that a new MNO-provided SU is available. In response to such an indication, SU management server 130 may determine which, if any, of the groups managed by SU management server 130 are associated with one or more mobile devices eligible to receive the new SU. In response to such a group being identified, SU management server 130 may issue a notification to a user or customer associated with the identified group that a new SU is available that affects one or more mobile devices associated with the user or customer. Examples of a notifications includes, but is not limited to, an email, a text message, and/or an alert. Such a notification may include a "deep link" that a recipient of the notification may use to directly proceed to a UI relating to the new SU (for example, the detail view UI 1000 illustrated in FIG. 10).

Various techniques may be used by SU management server 130 to selectively control to which mobile devices, and when, selected MNO-provided SUs are made available. In one example, DM server 135 may be configured to, as a default, identify eligible mobile devices for an MNO-provided SU based on criteria associated with the SU, and make the SU available to the identified eligible mobile devices in accordance with a release time, such as release time 828 discussed in connection with FIG. 8. In some implementations, this default behavior may be overridden by a "blacklist," where, for example, a separate blacklist may be used for each MNO-provided SU. If a mobile device is included in a blacklist for an SU, for example by using a unique identifier for the mobile device such as, but not limited to, an MDN for the mobile device, DM server 135 will not make the SU available for that mobile device. DM server 135 may provide an interface for SU management server 130 to identify mobile devices to include in a blacklist for an MNO-provided SU; for example, the interface may allow adding and removing mobile devices from the blacklist. The blacklist may be recorded in database server 145, with DM server 135 and/or SU management server 130 configured to add mobile devices to the blacklist, remove mobile devices from the blacklist, and/or determine whether a mobile device is included in the blacklist via database server 145.

SU management server 130 may be configured to determine whether a mobile device is currently subject to a postponement. Various techniques may be used. For example, some or all such determinations may be event driven and made in response to events such as, but not limited to, a postponement being created (for example, as a result of a user instruction such as via a UI provided in response to a user's selection of add postponement button 866 illustrated in FIG. 8, or a postponement being automatically created due to an automatic postponement setting for a group being enabled), a postponement being edited (for example, changing a scheduled time for the postponement or which group or groups are associated with the postponement), a postponement being deleted, an eligible mobile device becoming associated with a group (for example, as a result of a group criteria for a group being changed, or the mobile device being newly associated with a customer), an eligible mobile device becoming deassociated from a group (for example, as a result of a group criteria for a group being changed, or the mobile device becoming deassociated from a customer), a group being deleted, a release of an MNO-provided SU to a mobile device (for example, via release button 860), and/or there being a new MNO-provided SU. In response to such events, associations between mobile devices, MNO-provided SUs, and scheduled times by be created, modified, and/or removed. In response to such events, immediately or shortly after the event a blacklist may be changed and DM server 135 notified of the change to allow an SU to be applied more quickly. As another example, some or all such determinations may be periodically performed (for example, once each day) to determine which MNO-provided SUs are postponed at a particular time and/or day, and/or associations between mobile devices, MNO-provided SUs, and scheduled times by be created, modified, and/or removed. SU management server 130 may be configured to determine whether a current time is the same as or later than a scheduled time for a postponement for determining whether a mobile device is currently subject to a postponement.

As discussed previously, where a mobile device is associated with multiple postponements for an MNO-provided SU with two or more associated scheduled times (for example, 13 mobile devices are associated with both postponements 856 and 862 in the example illustrated in FIG. 8), SU management server 130 may determine an effective scheduled time for the mobile device in determining whether the mobile device is currently subject to a postponement.

In response to a determination that a mobile device is subject to a postponement of an MNO-provided SU at a particular time (such as the current time), SU management server 130 may include the mobile device in a blacklist associated with the SU; for example, the mobile device may be added to the blacklist. In response to a determination that a mobile device is not subject to a postponement of an MNO-provided SU at a particular time (such as the current time), SU management server 130 may exclude or omit the mobile device in a blacklist associated with the SU; for example, the mobile device may be removed from the blacklist. For example, SU management server 130 may add a mobile device to a blacklist for an MNO-provided SU to postpone availability of the SU to the mobile device, and once a scheduled time for the postponement has arrived or passed, SU management server 130 may remove the mobile device from the blacklist, making under SU available to the mobile device according to the default behavior of DM server 135.

In some circumstances a user may request an MNO-provided SU be released, and as a result made available, to a mobile device at a current time. FIG. 8 illustrates an example of a release button 860; in response to a user selecting release button 860 the corresponding SU may be currently made available to the mobile devices to which postponement 856 applies (there are 13 such devices in the example illustrated in FIG. 8). A release of an MNO-provided SU to a mobile device may result in SU management server 130 determining that the mobile device is not subject to a postponement of the SU which, as discussed in the previous paragraph, may cause the mobile device to be excluded from a blacklist associated with the SU.

In some implementations, DM server 135 may be configured to utilize whitelists associated with MNO-provided SUs, wherein in response to a mobile device being included in a whitelist for an SU (which may include an MNO-provided SU or a customer-provided SU), DM server 135 will make the SU available to the mobile device. The SU may be made available to the mobile device before a release time associated with the SU in response to the mobile device being included in the whitelist for the SU; for example, this may be useful for applying an SU to one or more mobile devices for testing. DM server 135 may provide an interface for SU management server 130 to identify mobile devices to include in a whitelist for an MNO-provided SU; for example, the interface may allow adding and removing mobile devices from the whitelist. The whitelist may be recorded in database server 145, with DM server 135 and/or SU management server 130 configured to add mobile devices to the whitelist, remove mobile devices from the whitelist, and/or determine whether a mobile device is included in the whitelist via database server 145. In some implementations a whitelist for an SU may take precedence over a blacklist for an SU, such that if a mobile device is included in both a whitelist for an SU and a blacklist for the same SU, the SU will be made available to the mobile device in response to its inclusion in the whitelist.

In some implementations, an availability time may be associated with one or more mobile devices in association with an SU (which may include an MNO-provided SU or a customer-provided SU), and DM server 135 may be configured to make the SU available to the one or more mobile devices in response to a current time being the same as or later than the availability time. DM server 135 may provide an interface for SU management server 130 to specify an availability time for a selected mobile device and a selected SU. The availability time may be recorded in association with the selected mobile device and the selected SU in database server 145, with DM server 135 and/or SU management server 130 configured to set and/or obtain availability times via database server 145.

In some implementations, DM server 135 may be configured to determine whether SU availability for a mobile device is managed via SU management server 130. For example, in response to a customer becoming authorized to use SU management server 130 some or all of the mobile devices associated with the customer may be designated as managed via SU management server 130. Such a designation may be recorded in association with one or more mobile devices in database server 145, and DM server 135 and/or SU management server 130 may be configured to obtain such a designation for a selected mobile device via database server 145. Not all mobile devices associated with a customer that is authorized to use SU management server 130 may have SU availability managed via SU distribution server 130. As a first example, DM server 135 may not be able to perform OTA delivery of SUs to some mobile devices, such as mobile devices 116 illustrated in FIG. 1, and such mobile devices may not be indicated as managed by SU management server 130. As a second example, mobile devices may need to be licensed to be managed by SU management server 130, and DM server 135 may determine a mobile device is not managed via SU management server 130 in response to the mobile device not being licensed for a particular service.

In response to DM server 135 determining that a mobile device is managed by SU management server 130, DM server 135 may be configured to interact with SU management server 130 before determining whether to make an SU available to the mobile device. For example, in response to a mobile device becoming newly managed by SU management server 130 (for example, in response to a customer associated with the mobile device becomes authorized to use SU management server, in response to the mobile device becoming associated with the server, and/or in response to the mobile device becoming licensed for management by SU management server) DM server 135 may indicate to SU management server that the mobile device is newly available, SU management server 130 may perform initial setup of its management of the mobile device (such as, but not limited to, associating the mobile device with groups having group criteria satisfied by the mobile device, and/or automatically postponing availability of an MNO-provided SU to the mobile device by adding the mobile device to a blacklist for the SU), and SU management server 130 may indicate to DM server 135 that its setup is complete. As another example, in response to DM server 135 determining that a mobile device is managed by SU management server 130, DM server 135 may be configured to request SU management server 130 to determine whether an SU, or which SUs, should be made available to a mobile device; for example, in response to a mobile device polling DM server 135 for available SUs, DM server 135 may obtain from SU management server 130 identifications of SUs to be made available to the mobile device, and accordingly make those SUs available to the mobile device.

In some examples, a customer may not be given control over DM server 135 making a selected MNO-provided SU available to a mobile device associated with the customer, even if the customer can control the availability of another MNO-provided SU to the same mobile device. For example, the selected MNO-provided SU may be designated as system critical, and in response to an SU being designated system critical, DM server 135 may not grant some or all customers control over the availability of the SU and/or obtain information about the SU. This may also be divided between managing OTA availability of MNO-provided SUs and managing OTA availability of customer-provided SUs, which is discussed in more detail below.

FIG. 11 illustrates an example of a UI 1100 including a customer-provided SU portion 1110 enabling a user to provide customer-provided SUs for OTA delivery, manage customer-provided SUs, utilize SU management server 130 to control when customer-provided SUs are made available to mobile devices associated with the group displayed in the UI 1100. The specific example illustrated in FIG. 11 displays a different group, named Modo_MR_Series, than the group name Modo_Phones illustrated in FIGS. 3-6, 8, and 9; an example of a group criteria for the group displayed in IU 1100 might be "(Make equal Modonova) and (Model begins MR)". Much as discussed with respect to MNO-provided SU portion 810 in connection with FIG. 8, customer-provided SU portion 1110 may include one or more listings of SU items, in which each of the listed items is eligible to be applied to one or more of the mobile devices associated with the group displayed in UI 1100. There may be additional customer-provided SUs, and another UI (not illustrated) may be provided that allows enumeration and review of the customer-provided SUs provided by a customer. Much as discussed above with respect to the MNO-provided SU items illustrated in FIG. 8, customer-provided SU items may be displayed in a compressed mode and/or an expanded mode showing additional information.

Figure 12:
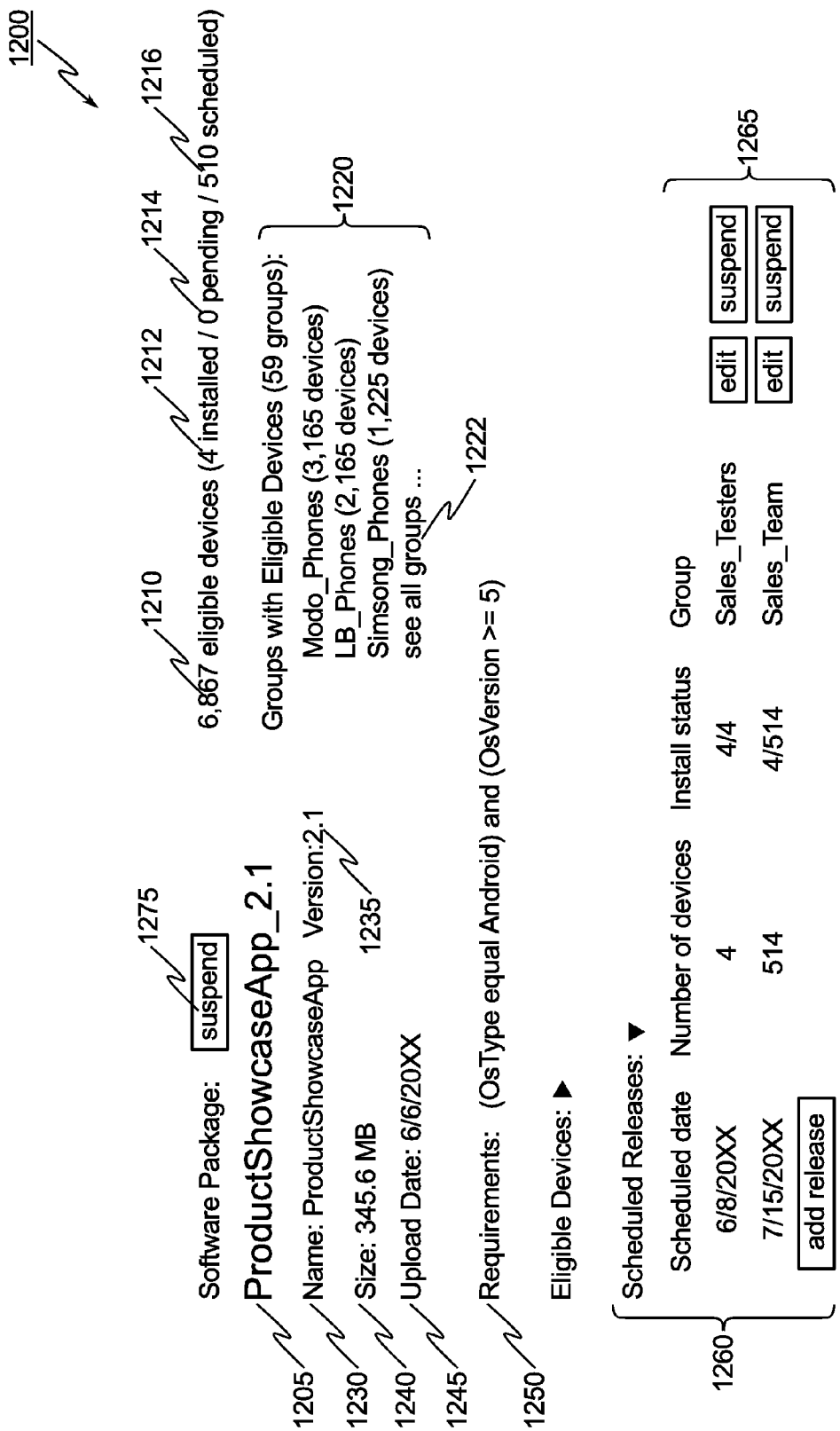
FIG. 12 illustrates an example of a UI providing a detail view for a customer-provided SU.

In the particular example illustrated in FIG. 11, customer-provided SU portion 1110 includes a first listing 1120 consisting of firmware updates, and a second listing consisting of non-firmware updates. For purposes of discussion of this particular example, the current time is June 8, 20XX. The first listing displays customer-provided SU items 1130, 1135, and 1140. Customer-provided SU item 1130 may display an SU identifier 1132, which is much like SU identifier 822 discussed in connection with FIG. 8. In response to a user selecting SU identifier 1132 or a user selecting edit button 1136, a detail view for the corresponding SU may be displayed. FIG. 12 illustrates an example of such a detail view for customer-provided SU item 1165.

Customer-provided SU item 1130 may display a scheduled time 1133 for the corresponding SU. Scheduled time 1133 may indicate a time the corresponding SU will first be made available to any of the eligible mobile devices associated with the group displayed in 1100 unless a user has requested the SU be made available to a mobile device (such as requesting the SU be made available to a mobile device before the release time for testing). In some circumstances there may be multiple releases, with different scheduled times, of a customer-provided SU affecting mobile devices associated with the group illustrated in UI 1100 (something similar is illustrated in FIG. 12 for the group named Sales_Team having a subgroup names Sales_Testers); in such a circumstance, a scheduled time displayed for a customer-provided SU item corresponding to the SU may be the earliest of the different scheduled times. A release schedule, much like release schedule 1265 in FIG. 12 or similar to postponement schedule 854 in FIG. 8, may be displayed and display information about the individual multiple releases, including their respective scheduled times, in an expanded view for a customer-provided SU item, much as postponement schedule 854 is displayed in expanded MNO-provided SU item 850 in FIG. 8. Customer-provided SU item 1130 may display a number 1135 of the mobile devices associated with the group displayed in UI 1100 that are eligible to receive the corresponding SU. Customer-provided SU item 1130 may display a number 1134 of the number 1135 of mobile devices to which the SU has been successfully applied. Customer-provided SU item 1130 may display a suspend button 1137 which may cause the corresponding SU to be made unavailable to the eligible mobile devices for the SU that are associated with the group displayed in the UI 1100, or may cause the SU to be made unavailable to all eligible mobile devices. If a suspension of a customer-provided SU makes the SU unavailable for all eligible mobile devices for the SU that are associated with the group displayed in FIG. 1100, a suspended indicator 1156 may be displayed for the corresponding customer-provided SU item. In response to a suspension of a customer-provided SU making the SU unavailable for all eligible mobile devices for the SU that are associated with the group displayed in FIG. 1100, a remove button 1157 may be displayed for the corresponding customer-provided SU item. In response to a user selection of remove button 1157, releases of the corresponding SU applying to one or more mobile devices included in the group displayed in FIG. 1100 may be deleted or a criteria associated with a release may be modified to exclude mobile devices associated with the group displayed in UI 1100 (for example, a criteria of "(GroupName equal Sales_Team)" may be changed to "(GroupName equal Sales_Team) and (GroupName not Modo_MR_Series)" based on a group criteria for the group displayed in UI 1100). In most implementations, a customer-provided SU is only made available to mobile devices associated with a customer that provided the SU.

Upload buttons 1150 and 1175 allows a user to provide a new customer-provided SU to the MNO, such as via SU management server 130, which may in turn register the new SU with SU management server 130 and/or DM server 135, and may upload the new SU to DM server 135 and/or content server 140. The user may provide details about the new SU, and schedule releases of the new SU to specified groups, using a UI similar to UI 1200 in FIG. 12. In response to a selection of upload button 1150, upload button 1175, or another UI element (not illustrated in FIG. 11), a user may identify a previously uploaded customer-provided SU, may review and modify details of the identified SU, and may schedule or modify releases for the identified SU. In response to a user having selected upload button 1150 to select or upload a customer-provided SU, a customer-provided SU item corresponding to the SU may be displayed in first list 1120. In response to a user having selected upload button 1175 to select or upload a customer-provided SU, a customer-provided SU item corresponding to the SU may be displayed in second list 1125. Each of customer-provided SU items 1140, 1145, 1155, 1160, 1165, and 1170 may display and/or include the features described for customer-provided SU item 1130.

FIG. 12 illustrates an example of a UI 1200 providing a detail view for a customer-provided SU. In the specific example illustrated in FIG. 12, UI 1200 is displaying information for the customer-provided SU corresponding to customer-provided SU item 1165 illustrated in FIG. 11. A number of UI elements included in UI 1200 are similar to counterpart UI elements included in UI 1000. For example, UI elements 1205, 1210, 1212, 1214, 1216, 1220, 1222, and 1240 have respective counterpart UI elements 1005, 1010, 1012, 1014, 1016, 1020, 1022, and 1050.

UI 1200 may display a package name 1230 for the SU, and may display a package version 1235 for the SU. Package name 1230 may be used for defining criteria (for example, for identifying mobile devices that a package has been applied to). Package version 1235 may also be used for defining criteria (for example, identifying mobile devices that at least a minimum version of a package has been applied to). Package name 1230 may be used for associating different versions of a customer-provided SU, and package version may be used to distinguish different versions of a package; for example, each of the SUs corresponding to customer-provided SU items 1155, 1160, and 1165 may have the same package name, but respective package versions 1.01, 2.0, and 2.1. In some examples, a package name and/or package version may likewise be associated with an MNO-provided SU. UI 1200 may display a time that the SU was uploaded by or for the customer.

UI 1200 may include release display region 1060 including a release schedule 1265. Release schedule 1265 operates in much the same manner as postponement schedule 1065 in FIG. 10. Much like a scheduled time for a postponement, a scheduled time for a release item included in release schedule 1265 may indicate a time that the SU will begin to be made available to the eligible mobile devices associated with group or groups associated with the release item, although in certain circumstances the SU may be made available to a mobile device prior to the scheduled time. The release items may also include a release button (not illustrated in FIG. 12) that releases the SU to the eligible mobile devices associated with a group or groups associated with a release item, much as release button 860 (described above in connection with FIG. 8) may be used to release an MNO-provided SU.

SU management server 130 may use some of the same techniques and features for controlling OTA delivery by DM server 135 of customer-provided SUs as discussed above for controlling OTA delivery of MNO-provided SUs. In some implementations, when a customer-supplied SU is registered with DM server 135, the SU may be assigned a release time that is significantly later than a current time; for example, 5-20 years after a current time. As a result, the default behavior for DM server 135 discussed above will not result in the SU being made available. To make the SU available to a mobile device in accordance with a scheduled time, such as scheduled time 1133 illustrated in FIG. 11, for a scheduled release of the SU, SU management server 130 may include the mobile device in a whitelist associated with the SU at approximately the scheduled time. In some circumstances, the mobile device may be removed from the whitelist to make it unavailable. Much as discussed above for OEM-provided SUs, an event driven approach may be used to determine that a mobile device should be added to or removed from a whitelist for a customer-provided SU.

Much as a mobile device may be associated with multiple postponements for an MNO-provided SU, a mobile device may be associated with multiple releases of a customer-provided SU two or more associated scheduled times, and SU management server 130 may determine an effective scheduled time for the mobile device.

Figure 13:
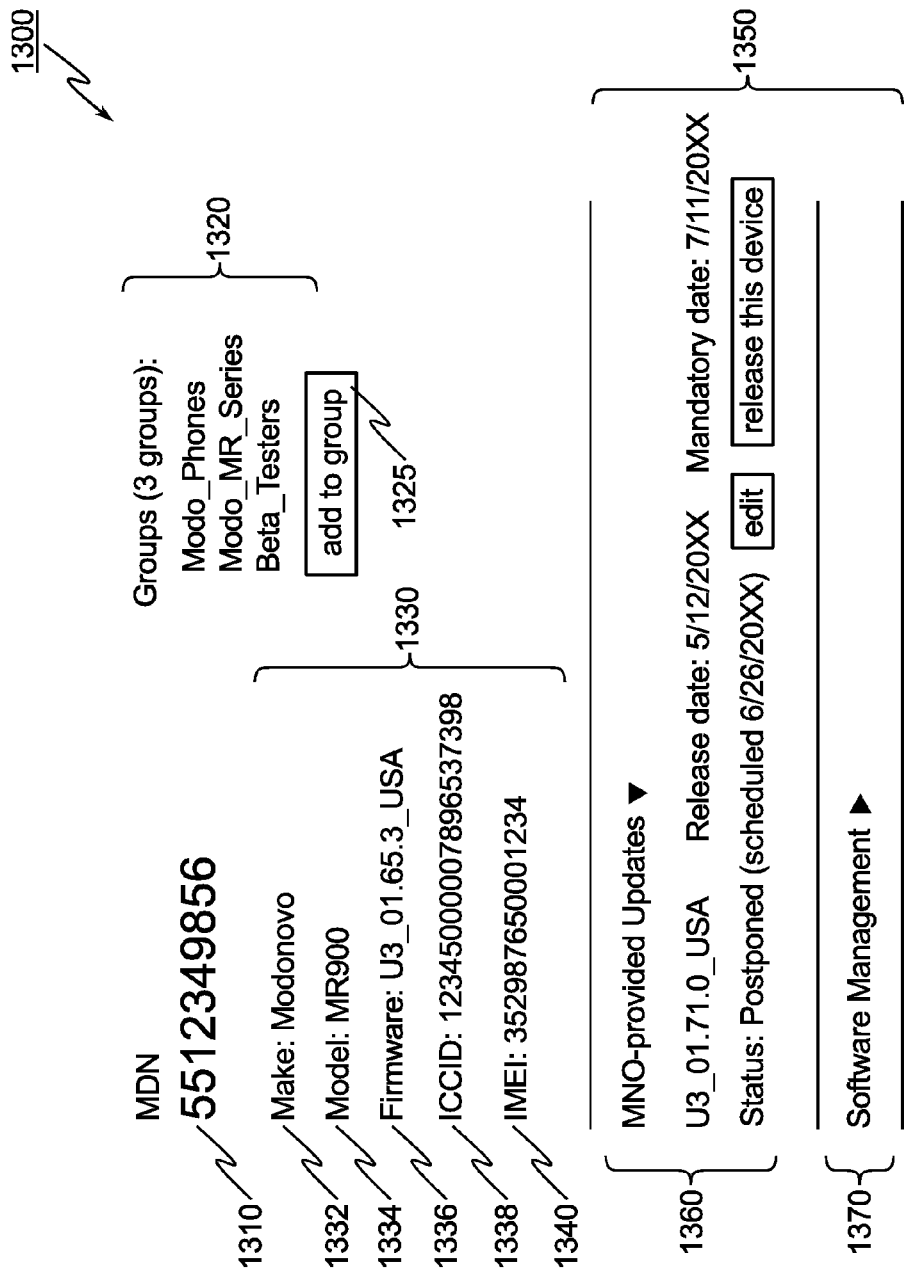
FIG. 13 illustrates an example of a UI providing a detail view for a mobile device.

FIG. 13 illustrates an example of a UI 1300 providing a detail view for a mobile device. UI 1300 displays an identifier 1310 for the mobile device displayed in UI 1300; in the specific example illustrated in FIG. 13, the identifier 1310 is unique identifier for the mobile device in the form of an MDN mobile device parameter value for the mobile device. Although not illustrated in FIG. 13, a UI element may be provided that allows a user to review, set, and/or modify an alternative identifier for the mobile device, such as a reader-friendly textual description of the mobile device or a user of the mobile device. UI 1300 may display group information 1320 for the mobile device, displaying some or all of the groups that the mobile device is associated with. In response to a user selecting add group button 1325, a UI may be displayed that results in the mobile device being added to an existing group, or may allow the user to create a new group associated with the mobile device. UI 1300 may include a mobile device parameter display area 1330, which displays values for parameters 1332, 1334, 1336, 1338, and 1340 in FIG. 13. UI 1300 may include eligible SU display area 1350, which includes MNO-provided SU portion 1360 and customer-provided SU portion 1370, wherein SU portions 1360 and 1370 may each list SUs that are eligible to be applied to the mobile device, and may include UI elements such as edit button 1362, for a detail view of a corresponding SU (such as the detail view for an MNO-provided SU illustrated in FIG. 10 or the detail view for a customer-provided SU illustrated in FIG. 12), or such as release button 1364, which causes the corresponding SU to be released, and as a result made available, to the mobile device via OTA delivery.

Figure 14:
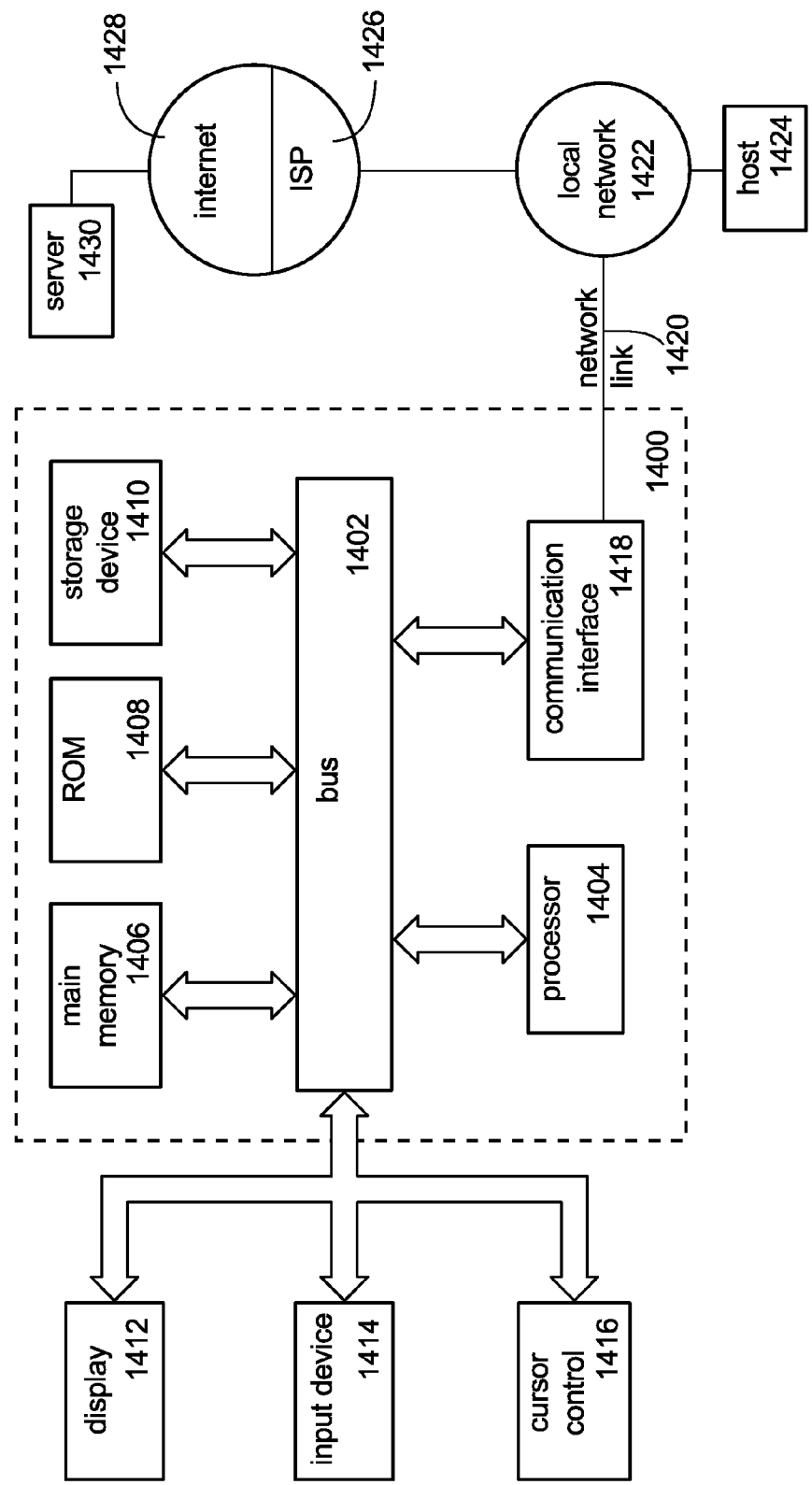
FIG. 14 is a block diagram that illustrates a computer system upon which aspects of this disclosure may be implemented.

FIG. 14 is a block diagram that illustrates a computer system 1400 upon which aspects of this disclosure may be implemented, such as, but not limited to mobile devices 110, SU management server 130, DM server 135, content server 140, database server 145, other computer systems operated by an MNO mentioned above, customer computer 155, and OEM computer 160. Computer system 1400 includes a bus 1402 or other communication mechanism for communicating information, and a processor 1404 coupled with bus 1402 for processing information. Computer system 1400 also includes a main memory 1406, such as a random access memory (RAM) or other dynamic storage device, coupled to bus 1402 for storing information and instructions to be executed by processor 1404. Main memory 1406 also may be used for storing temporary variables or other intermediate information during execution of instructions to be executed by processor 1404. Computer system 1400 further includes a read only memory (ROM) 1408 or other static storage device coupled to bus 1402 for storing static information and instructions for processor 1404. A storage device 1410, such as a magnetic disk or optical disk, is provided and coupled to bus 1402 for storing information and instructions.

Computer system 1400 may be coupled via bus 1402 to a display 1412, such as a cathode ray tube (CRT) or liquid crystal display (LCD), for displaying information to a computer user. An input device 1414, including alphanumeric and other keys, is coupled to bus 1402 for communicating information and command selections to processor 1404. Another type of user input device is cursor control 1416, such as a mouse, a trackball, or cursor direction keys for communicating direction information and command selections to processor 1404 and for controlling cursor movement on display 1412. This input device typically has two degrees of freedom in two axes, a first axis (e.g., x) and a second axis (e.g., y), that allows the device to specify positions in a plane. Another type of user input device is a touchscreen, which generally combines display 1412 with hardware that registers touches upon display 1412.

This disclosure is related to the use of computer systems such as computer system 1400 for implementing the techniques described herein. In some examples, those techniques are performed by computer system 1400 in response to processor 1404 executing one or more sequences of one or more instructions contained in main memory 1406. Such instructions may be read into main memory 1406 from another machine-readable medium, such as storage device 1410. Execution of the sequences of instructions contained in main memory 1406 causes processor 1404 to perform the process steps described herein. In some examples, hard-wired circuitry may be used in place of or in combination with software instructions to implement the various aspects of this disclosure. Thus, implementations are not limited to any specific combination of hardware circuitry and software.

The term "machine-readable medium" as used herein refers to any medium that participates in providing data that causes a machine to operation in a specific fashion. In some examples implemented using computer system 1400, various machine-readable media are involved, for example, in providing instructions to processor 1404 for execution. Such a medium may take many forms, including but not limited to, non-volatile media, volatile media, and transmission media. Non-volatile media includes, for example, optical or magnetic disks, such as storage device 1410. Volatile media includes dynamic memory, such as main memory 1406. Transmission media includes coaxial cables, copper wire and fiber optics, including the wires that comprise bus 1402. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 1404 for execution. For example, the instructions may initially be carried on a magnetic disk of a remote computer. The remote computer can load the instructions into its dynamic memory and send the instructions over a telephone line using a modem. A modem local to computer system 1400 can receive the data on the telephone line and use an infra-red transmitter to convert the data to an infra-red signal. An infra-red detector can receive the data carried in the infra-red signal and appropriate circuitry can place the data on bus 1402. Bus 1402 carries the data to main memory 1406, from which processor 1404 retrieves and executes the instructions. The instructions received by main memory 1406 may optionally be stored on storage device 1410 either before or after execution by processor 1404.

Computer system 1400 also includes a communication interface 1418 coupled to bus 1402. Communication interface 1418 provides a two-way data communication coupling to a network link 1420 that is connected to a local network 1422. For example, communication interface 1418 may be an integrated services digital network (ISDN) card or a modem to provide a data communication connection to a corresponding type of telephone line. As another example, communication interface 1418 may be a local area network (LAN) card to provide a data communication connection to a compatible LAN. Wireless links may also be implemented. In any such implementation, communication interface 1418 sends and receives electrical, electromagnetic or optical signals that carry digital data streams representing various types of information.

Network link 1420 typically provides data communication through one or more networks to other data devices. For example, network link 1420 may provide a connection through local network 1422 to a host computer 1424 or to data equipment operated by an Internet Service Provider (ISP) 1426. ISP 1426 in turn provides data communication services through the world wide packet data communication network now commonly referred to as the "Internet" 1428. Local network 1422 and Internet 1428 both use electrical, electromagnetic or optical signals that carry digital data streams. The signals through the various networks and the signals on network link 1420 and through communication interface 1418, which carry the digital data to and from computer system 1400, are exemplary forms of carrier waves transporting the information.

Computer system 1400 can send messages and receive data, including program code, through the network(s), network link 1420 and communication interface 1418. In the Internet example, a server 1430 might transmit a requested code for an application program through Internet 1428, ISP 1426, local network 1422 and communication interface 1418.

The received code may be executed by processor 1404 as it is received, and/or stored in storage device 1410, or other non-volatile storage for later execution. In this manner, computer system 1400 may obtain application code in the form of a carrier wave.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A method comprising:
   obtaining parameter-based group criteria for mobile devices to be associated with a user-specified group, the parameter-based group criteria identifying a set of mobile devices from a plurality of mobile devices associated with a first customer;
   determining that a first mobile device is associated with the first customer;
   determining that a parameter of the first mobile device satisfies the parameter-based group criteria;
   obtaining a release time for the user-specified group in connection with a first software update;
   determining that a second mobile device is associated with a second customer that is different from the first customer or that the second mobile device is not associated with the first customer;
   determining, by a network device, that availability of the first software update should not be indicated prior to the release time to the first mobile device based on the determination that the first mobile device satisfies the parameter-based group criteria;
   indicating, by a network device, at a first time, to the first mobile device that the first software update is available to be downloaded and applied to the first mobile device based on the first time occurring during or after the release time; and
   determining that availability of the first software update should not be indicated to the second mobile device based on the determination that the second mobile device is associated with the second customer or that the second mobile device is not associated with the first customer.

2. The method of claim 1, wherein:
   the indicating at the first time is performed according to an OTA (over-the-air) protocol; and
   the method further comprises delivering, at or after the first time, the first software update to the first mobile device according to the OTA protocol.

3. The method of claim 1, further comprising:
   determining that a third mobile device is newly registered for software update management;
   determining that the third mobile device satisfies the parameter based group criteria; and
   determining, in response to the determination that the third mobile device is newly registered, that availability of a second software update should not be indicated prior to the release time to the third mobile device based on the determination that the third mobile device satisfies the parameter based group criteria.

4. The method claim 1, further comprising:
   receiving one or more indications each indicating that a respective mobile device included in the set of mobile devices successfully applied the first software update; and
   displaying to a user a number of successful applications of the first software update based on the received indications.

5. The method of claim 1, further comprising:
   obtaining first eligibility criteria for mobile devices to which the first software update may be applied;
   determining that a third mobile device satisfies the first eligibility criteria;
   indicating, at a second time, to the third mobile device that the first software update is available; and
   determining that the first mobile device satisfies the first eligibility criteria;
   wherein the release time occurs later than the second time.

6. The method of claim 5, the method further comprising:
   determining that the first software update has been newly registered for delivery to mobile devices;
   obtaining a distribution time for the first software update, wherein the distribution time occurs during or before the second time; and
   calculating, in response to the determination that the first software update has been newly registered, the release time by adding an amount of time to the distribution time.

7. The method of claim 5, further comprising:
including the first mobile device in a blacklist for the first software update prior to the release time in response to the determination that availability of the first software update should not be indicated prior to the release time to the first mobile device; and
excluding the first mobile device from the blacklist at or after the release time;
wherein the indicating at the first time is further based on the first mobile device being not included in the blacklist.

8. The method of claim 1, further comprising:
providing a graphical user interface enabling the first customer to upload a software update;
receiving the first software update via the graphical user interface; and
determining that the first software update is associated with the first customer.

9. The method of claim 1, further comprising:
excluding the first mobile device from a whitelist for the first software update prior to the release time based on the determination that availability of the first software update should not be indicated prior to the release time to the first mobile device; and
including the first mobile device in the whitelist at or after the release time;
wherein the indicating at the first time is further based on the first mobile device being included in the whitelist.

10. One or more non-transitory computer readable media including instructions recorded thereon which, when executed by one or more computer processors, cause the computer processors to perform the method of claim 1.

11. A system comprising:
one or more computer processors;
one or more computer readable media including instructions which, when executed by the one or more computer processors, cause the one or more processors to:
obtain parameter-based group criteria for mobile devices to be associated with a user-specified group, the parameter based group criteria identifying a set of mobile devices from a plurality of mobile devices associated with a first customer;
determine that the first mobile device is associated with the first customer;
determine that a parameter of the first mobile device satisfies the parameter-based group criteria;
obtain a release time for the user-specified group in connection with a first software update;
determine that a second mobile device is associated with a second customer that is different from the first customer or that the second mobile device is not associated with the first customer;
determine, by a network device, that availability of the first software update should not be indicated prior to the release time to the first mobile device based on the determination that the first mobile device satisfies the parameter based group criteria;
indicate, by a network device, at a first time, to the first mobile device that the first software update is available based on the first time occurring during or after the release time, and
determine that availability of the first software update should not be indicated to the second mobile device based on the determination that the second mobile device is associated with the second customer or that the second mobile device is not associated with the first customer.

12. The system of claim 11, wherein:
the indication at the first time is performed according to an OTA (over-the-air) protocol; and
the computer readable media further include instructions which, when executed by the one or more computer processors, cause the one or more processors to deliver, at or after the first time, the first software update to the first mobile device according to the OTA protocol.

13. The system of claim 11, wherein the computer readable media further include instructions which, when executed by the one or more computer processors, cause the one or more processors to:
determine that a third mobile device is newly registered for software update management;
determine that the third mobile device satisfies the parameter-based group criteria; and
determine, in response to the determination that the third mobile device is newly registered, that availability of a second software update should not be indicated prior to the release time to the third mobile device based on the determination that the third mobile device satisfies the parameter-based group criteria.

14. The system of claim 11, wherein the computer readable media further include instructions which, when executed by the one or more computer processors, cause the one or more processors to:
receive one or more indications each indicating that a respective mobile device included in the set of mobile devices successfully applied the first software update; and
display to a user a number of successful applications of the first software update based on the received indications.

15. The system of claim 11, wherein the computer readable media further include instructions which, when executed by the one or more computer processors, cause the one or more processors to:
obtain first eligibility criteria for mobile devices to which the first software update may be applied;
determine that a third mobile device satisfies the first eligibility criteria;
indicate, at a second time, to the third mobile device that the first software update is available; and
determine that the first mobile device satisfies the first eligibility criteria;
wherein the release time occurs later than the second time.

16. The system of claim 15, wherein the computer readable media further include instructions which, when executed by the one or more computer processors, cause the one or more processors to:
determine that the first software update has been newly registered for delivery to mobile devices;
obtain a distribution time for the first software update, wherein the distribution time occurs during or before the second time; and
calculate, in response to the determination that the first software update has been newly registered, the release time by adding an amount of time to the distribution time.

17. The system of claim 15, wherein the computer readable media further include instructions which, when executed by the one or more computer processors, cause the one or more processors to:
include the first mobile device in a blacklist for the first software update prior to the release time in response to the determination that availability of the first software update should not be indicated prior to the release time to the first mobile device; and exclude the first mobile device from the blacklist at or after the release time;

wherein the indicating at the first time is further based on the first mobile device being not included in the blacklist.

18. The system of claim 11, wherein the computer readable media further include instructions which, when executed by the one or more computer processors, cause the one or more processors to:

provide a graphical user interface enabling the first customer to upload a software update;

receive the first software update via the graphical user interface; and determine that the first software update is associated with the first customer.

* * * * *